(12) United States Patent
Asai et al.

(10) Patent No.: US 11,765,015 B2
(45) Date of Patent: *Sep. 19, 2023

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Fumika Asai, Musashino (JP); Kimihiko Fukami, Musashino (JP); Shunsuke Kanai, Musashino (JP); Masataka Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/912,102

(22) PCT Filed: Mar. 19, 2020

(86) PCT No.: PCT/JP2020/012427
§ 371 (c)(1),
(2) Date: Sep. 16, 2022

(87) PCT Pub. No.: WO2021/186702
PCT Pub. Date: Sep. 23, 2021

(65) Prior Publication Data
US 2023/0134812 A1    May 4, 2023

(51) Int. Cl.
*H04L 41/0631* (2022.01)
*H04L 41/22* (2022.01)

(52) U.S. Cl.
CPC .......... *H04L 41/0645* (2013.01); *H04L 41/22* (2013.01)

(58) Field of Classification Search
None
See application file for complete search history.

(56) References Cited

U.S. PATENT DOCUMENTS 9,189,319 B2 * 11/2015 Ito ........................ G06F 11/0748
9,215,551 B2 * 12/2015 Yang ..................... H04W 72/04
(Continued)

OTHER PUBLICATIONS

Kimihiko Fukami et al., Study on Method of Identifying Service Influence Occurred by Network Fault, IEICE Technical Report, vol. 118, No. 483, 2019, pp. 13-18.
(Continued)

*Primary Examiner* — Ranodhi Serrao
(74) *Attorney, Agent, or Firm* — Harness, Dickey & Pierce, P.L.C.

(57) ABSTRACT

A network management apparatus acquires a given information object related to a plurality of occurrence paths of a failure in a logical layer of a network configuration; and retrieves, as a candidate of a facility to be a failure cause, information objects related to the facility layer and the physical layer commonly associated with the given information object; calculates, for each of the retrieved information objects, the number of information objects which are associated with the object and which are related to the plurality of occurrence paths of the failure as a multiplicity; and calculates, for each of the retrieved information objects, a proportion of the multiplicity with respect to the number of information objects in the logical layer which are affected when the failure occurs in the object.

7 Claims, 35 Drawing Sheets

(56) References Cited

U.S. PATENT DOCUMENTS

| | | | |
|---|---|---|---|
| 9,306,806 B1 * | 4/2016 | Zhang | H04L 41/0866 |
| 9,436,541 B2 * | 9/2016 | Kendi | H04L 43/091 |
| 9,871,702 B2 * | 1/2018 | Purdy | H04L 41/0233 |
| 2014/0221032 A1 * | 8/2014 | Yang | H04W 72/04 |
| | | | 455/509 |
| 2015/0127988 A1 * | 5/2015 | Kendi | G06F 11/079 |
| | | | 714/37 |
| 2017/0237628 A1 * | 8/2017 | Purdy | H04L 41/0843 |
| | | | 709/223 |
| 2018/0083847 A1 * | 3/2018 | Chiba | H04L 69/22 |
| 2018/0091395 A1 * | 3/2018 | Shinohara | G06F 9/45558 |
| 2018/0115485 A1 * | 4/2018 | Chiba | H04L 45/74 |

OTHER PUBLICATIONS

Kimihiko Fukami et al., Study on Method of Identifying affected equipment to support recovery operation in a large-scale disaster, IEICE Technical Report, vol. 119, No. 358, 2020, pp. 19-24.

* cited by examiner

Fig. 1

| LAYER TYPE | ENTITY NAME | MEANING | ATTRIBUTE | DESCRIPTION |
|---|---|---|---|---|
| FACILITY | PS (Physical Structure) | FACILITY SUCH AS HOUSING, BUILDING OR MANHOLE | status | ATTRIBUTE INDICATING STATE OF PS ENTITY NORMAL: TRUE, FAILURE: FALSE |
| | | | pdList | ARRAY OF PD ENTITIES INCLUDED IN PS ENTITY |
| | | | asList | ARRAY OF AS ENTITIES INCLUDED IN PS ENTITY |
| | | | position | TWO-DIMENSIONAL COORDINATES INDICATING POSITION OF PS ENTITY |
| | AS (Aggregate Section) | CABLE, COMMUNICATION LINE, OR CABLE TUNNEL/ SERVICE TUNNEL | status | ATTRIBUTE INDICATING STATE OF AS ENTITY NORMAL: TRUE, FAILURE: FALSE |
| | | | plList | ARRAY OF PL ENTITIES INCLUDED IN AS ENTITY |
| | | | position | TWO-DIMENSIONAL COORDINATES INDICATING POSITION OF AS ENTITY |

Fig. 2

| LAYER TYPE | ENTITY NAME | MEANING | ATTRIBUTE | DESCRIPTION |
|---|---|---|---|---|
| PHYSICAL | PD (Physical Device) | APPARATUS | status | ATTRIBUTE INDICATING STATE OF PD ENTITY NORMAL OPERATION: TRUE, ABNORMAL OPERATION: FALSE |
| | | | ppList | ARRAY OF PP ENTITIES INCLUDED IN PD ENTITY |
| | | | position | TWO-DIMENSIONAL COORDINATES INDICATING POSITION OF PD ENTITY |
| | PP (Physical Port) | COMMUNICATION PORT INCLUDED IN APPARATUS | status | ATTRIBUTE INDICATING STATE OF PP ENTITY NORMAL OPERATION: TRUE, ABNORMAL OPERATION: FALSE |
| | | | position | TWO-DIMENSIONAL COORDINATES INDICATING POSITION OF PD ENTITY |
| | PL (Physical Link) | CORE WIRE OF CABLE | status | ATTRIBUTE INDICATING STATE OF PL ENTITY NORMAL OPERATION: TRUE, ABNORMAL OPERATION: FALSE |
| | | | pcList | ARRAY OF PC ENTITIES INCLUDED IN PL ENTITY |
| | PC (Physical Connector) | CONNECTING CONNECTOR OF CABLE | status | ATTRIBUTE INDICATING STATE OF PC ENTITY NORMAL OPERATION: TRUE, ABNORMAL OPERATION: FALSE |
| | | | ppList | ARRAY OF PP ENTITIES INCLUDED IN PC ENTITY |

Fig. 3

| LAYER TYPE | ENTITY NAME | MEANING | ATTRIBUTE | DESCRIPTION |
|---|---|---|---|---|
| LOGICAL (LOGICAL DEVICE LAYER) | TL (Topological Link) | CONNECTIVITY BETWEEN APPARATUSES (INSIDE LOGICAL DEVICE LAYER) | endPointList | ARRAY OF TPE ENTITIES CONSTITUTING TL ENTITY |
| | | | status | ATTRIBUTE INDICATING STATE OF TL ENTITY NORMAL OPERATION: TRUE, ABNORMAL OPERATION: FALSE |
| | NFD (Network Fowarding Domain) | TRANSFERABLE RANGE IN APPARATUS (INSIDE LOGICAL DEVICE LAYER) | endPointList | ARRAY OF TPE ENTITIES CONSTITUTING NFD ENTITY |
| | | | status | ATTRIBUTE INDICATING STATE OF NFD ENTITY NORMAL OPERATION: TRUE, ABNORMAL OPERATION: FALSE |
| | TPE (Termination Point Encapsulation) | TERMINATION OF COMMUNICATION | tpeRefList | ARRAY OF TPE ENTITIES INCLUDING TPE ENTITY OF CORRESPONDING LOWER LAYER (1 ARRAY IN EMBODIMENT) |
| | | | ppRefList | ARRAY OF PP ENTITIES CORRESPONDING TO TPE ENTITY (1 ARRAY IN EMBODIMENT) |
| | | | status | ATTRIBUTE INDICATING STATE OF TPE ENTITY NORMAL OPERATION: TRUE, ABNORMAL OPERATION: FALSE |
| | | | layerName | NAME OF LAYER |

Fig. 4

| LAYER TYPE | ENTITY NAME | MEANING | ATTRIBUTE | DESCRIPTION |
|---|---|---|---|---|
| LOGICAL (COMMUNI-CATION LAYER) | FRE (Forwarding Relationship Encapsulation) | | | |
| | LC (Link Connect) | CONNECTIVITY BETWEEN APPARATUSES (INSIDE COMMUNICATION LAYER) | endPointList | ARRAY OF TPE ENTITIES CONSTITUTING LC ENTITY |
| | | | status | ATTRIBUTE INDICATING STATE OF LC ENTITY NORMAL OPERATION: TRUE, ABNORMAL OPERATION: FALSE |
| | | | layerName | NAME OF LAYER |
| | XC (Cross(X) Connect) | CONNECTIVITY BETWEEN APPARATUSES (INSIDE COMMUNICATION LAYER) | endPointList | ARRAY OF TPE ENTITIES CONSTITUTING XC ENTITY |
| | | | status | ATTRIBUTE INDICATING STATE OF XC ENTITY NORMAL OPERATION: TRUE, ABNORMAL OPERATION: FALSE |
| | | | layerName | NAME OF LAYER |
| | NC (Network Connect) | CONNECTIVITY OF END-END FORMED BY LC AND XC (INSIDE COMMUNICATION LAYER) | endPointList | ARRAY OF TPE ENTITIES CONSTITUTING LC OR XC ENTITY |
| | | | status | ATTRIBUTE INDICATING STATE OF NC ENTITY NORMAL OPERATION: TRUE, ABNORMAL OPERATION: FALSE |
| | | | userList | ARRAY OF CHARACTER STRINGS RETAINING SUBSCRIBER NAME OR URL OF IF FOR ACQUIRING SUBSCRIBER NAME |
| | | | layerName | NAME OF LAYER |

Fig. 10

| PROCEDURE | FRE (LC)_APPARATUS_1 | FRE (LC)_APPARATUS_2 | FRE (LC)_APPARATUS_3 |
|---|---|---|---|
| (1) | TPE_APPARATUS_1_1<br>TPE_APPARATUS_3_1 | TPE_APPARATUS_1_2<br>TPE_APPARATUS_4_1 | TPE_APPARATUS_2_1<br>TPE_APPARATUS_5_1 |
| (2) | PP_APPARATUS_1_1<br>PP_APPARATUS_3_1 | PP_APPARATUS_1_2<br>PP_APPARATUS_4_1 | PP_APPARATUS_2_1<br>PP_APPARATUS_5_1 |
| (3) | PD_APPARATUS_1<br>PD_APPARATUS_3 | PD_APPARATUS_1<br>PD_APPARATUS_4 | PD_APPARATUS_2<br>PD_APPARATUS_5 |
| (4) | PS_A<br>PS_B | PS_A<br>PS_C | PS_A<br>PS_D |
| (5) | PL_APPARATUS_1 | PL_APPARATUS_2 | PL_APPARATUS_3 |
| (6) | AS_1,2,3 | AS_1,2,4,5 | AS_1,2,4,6 |

Fig. 11

| PROCEDURE | FRE (LC)_APPARATUS_1 | FRE (LC)_APPARATUS_2 | FRE (LC)_APPARATUS_3 | |
|---|---|---|---|---|
| (1) | TPE_APPARATUS_1_1<br>TPE_APPARATUS_3_1 | TPE_APPARATUS_1_2<br>TPE_APPARATUS_4_1 | TPE_APPARATUS_2_1<br>TPE_APPARATUS_5_1 | |
| (2) | PP_APPARATUS_1_1<br>PP_APPARATUS_3_1 | PP_APPARATUS_1_2<br>PP_APPARATUS_4_1 | PP_APPARATUS_2_1<br>PP_APPARATUS_5_1 | |
| (3) | PD_APPARATUS_1<br>PD_APPARATUS_3 | PD_APPARATUS_1<br>PD_APPARATUS_4 | PD_APPARATUS_2<br>PD_APPARATUS_5 | ~a |
| (4) | PS_A, PS_B | PS_A, PS_C | PS_A, PS_D | ~b |
| (5) | PL_APPARATUS_1 | PL_APPARATUS_2 | PL_APPARATUS_3 | |
| (6) | AS_1,2,3 | AS_1,2,4,5 | AS_1,2,4,6 | ~c |

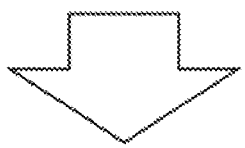

| RESOURCE TYPE | RESOURCE NAME | MULTIPLICITY | |
|---|---|---|---|
| PD | PD_APPARATUS_1 | 2 | ~d |
| PS | PS_A | 3 | |
| AS | AS_1 | 3 | |
| AS | AS_2 | 3 | |
| AS | AS_4 | 2 | |

Fig. 13

| RESOURCE TYPE | RESOURCE NAME | MULTIPLICITY | FAILURE RATE |
|---|---|---|---|
| PD | PD_APPARATUS_1 | 2 | 1.0 (2/2) |
| PS | PS_A | 3 | 0.75 (3/4) |
| AS | AS_1 | 3 | 0.75 (3/4) |
| AS | AS_2 | 3 | 1.0 (3/3) |
| AS | AS_4 | 2 | 1.0 (2/2) |

Fig. 14

| RESOURCE TYPE | RESOURCE NAME | MULTIPLICITY | FAILURE RATE |
|---|---|---|---|
| AS | AS_2 | 3 | 1.0 (3/3) |
| PS | PS_A | 3 | 0.75 (3/4) |
| AS | AS_1 | 3 | 0.75 (3/4) |
| PD | PD_APPARATUS_1 | 2 | 1.0 (2/2) |
| AS | AS_4 | 2 | 1.0 (2/2) |

Fig. 17

| LAYER TYPE | SPEC NAME | MEANING |
|---|---|---|
| FACILITY | PS Spec (Physical Structure Specification) | ATTRIBUTE UNIQUE TO EACH PS IS DEFINED |
| | AS Spec (Aggregate Section Specification) | ATTRIBUTE UNIQUE TO EACH AS IS DEFINED |
| PHYSICAL | PD Spec (Physical Device Specification) | ATTRIBUTE UNIQUE TO EACH PD IS DEFINED |
| | PP Spec (Physical Port Specification) | ATTRIBUTE UNIQUE TO EACH PP IS DEFINED |
| | PL Spec (Physical Link Specification) | ATTRIBUTE UNIQUE TO EACH PL IS DEFINED |
| | PC Spec (Physical Connector Specification) | ATTRIBUTE UNIQUE TO EACH PC IS DEFINED |

Fig. 18

| LAYER TYPE | SPEC NAME | MEANING |
|---|---|---|
| LOGICAL | TL Spec (Topological Link Specification) | ATTRIBUTE UNIQUE TO EACH TL IS DEFINED |
| | NFD Spec (Network Forwarding Domain Specification) | ATTRIBUTE UNIQUE TO EACH NFD IS DEFINED |
| | TPE Spec (Termination Point Encapsulation Specification) | ATTRIBUTE UNIQUE TO EACH TPE IS DEFINED |
| | NC Spec (Network Connection Specification) | ATTRIBUTE UNIQUE TO EACH NC IS DEFINED |
| | LC Spec (Link Connect Specification) | ATTRIBUTE UNIQUE TO EACH LC IS DEFINED |
| | XC Spec (Cross(X) Connect Specification) | ATTRIBUTE UNIQUE TO EACH XC IS DEFINED |

Fig. 20

| Specification TABLE | |
|---|---|
| COLUMN NAME | TYPE |
| Entity | EXTERNAL KEY |
| SpecCharacteristic | EXTERNAL KEY |

Fig. 21

| SpecCharacteristic TABLE | |
|---|---|
| COLUMN NAME | TYPE |
| name | String |
| valueFrom | int |
| valueTo | int |
| type | String |

Fig. 22

| Entity TABLE | |
|---|---|
| COLUMN NAME | TYPE |
| ... | ... |
| ... | ... |

Fig. 23

| CharacteristicValue TABLE | |
|---|---|
| COLUMN NAME | TYPE |
| SpecCharacteristic (EXTERNAL KEY) | ~ |
| CharacteristicName | String |
| value | String |

Fig. 27

| TYPE OF FAILURE LOCATION ENTITY ARRAY | |
|---|---|
| FAILURE PASS ENTITY NAME | OBJECT TYPE |
| PS ENTITY LIST (ARRAY) | PS ENTITY TYPE (ARRAY) |
| AS ENTITY LIST (ARRAY) | AS ENTITY TYPE (ARRAY) |
| PD ENTITY LIST (ARRAY) | PD ENTITY TYPE (ARRAY) |

Fig. 33

| TYPE OF MULTIPLE /FAILURE RATE ENTITY ARRAY ||
|---|---|
| MULTIPLE ENTITY | OBJECT TYPE |
| MULTIPLICITY | INT TYPE |
| FAILURE RATE | FLOAT TYPE |

Fig. 34

EXAMPLE OF FAILURE LOCATION ENTITY ARRAY

| ARRAY INDEX | FAILURE PASS ENTITY NAME | PS Entity List | AS Entity List | PD Entity List |
|---|---|---|---|---|
| 1 | FRE (LO) _APPARATUS_2 | PS_A, PS_D | AS_2 | PD_APPARATUS_3 PD_APPARATUS_4 |
| 2 | FRE (LO) _APPARATUS_3 | PS_A, PS_F | AS_2 | PD_APPARATUS_5 PD_APPARATUS_6 | a — PS Entity List column
b — AS Entity List column
c — PD Entity List column

NETWORK MANAGEMENT APPARATUS, METHOD, AND PROGRAM

CROSS-REFERENCE TO RELATED APPLICATIONS

This application is a 371 U.S. National Phase of International Application No. PCT/JP2020/012427, filed on Mar. 19, 2020. The entire disclosure of the above application is incorporated herein by reference.

TECHNICAL FIELD

The present embodiment relates to a network management apparatus, a method, and a program.

BACKGROUND ART

There are techniques for simulatively generating a failure in a building, a communication cable, a communication apparatus, or a communication medium on a physical layer which realizes a service by a communication network and, when simulating an effect of the failure on the service, specifying the effect on the service using a same method regardless of a type of the service or a type of the NW (for example, refer to NPL 1).

The technique disclosed in NPL 1 described above does not provide means of specifying a candidate of a location on the physical layer having caused a failure that occurred on a transmission layer or a service layer on top of a logical layer.

In addition, there are techniques for specifying a physical layer object that is multiply used by a logical layer in an apparatus, a core wire, a building, or a cable on a physical layer to be a cause of a failure on the logical layer in order to specify a candidate of a location on the physical layer having caused the failure (for example, refer to NPL 2).

CITATION LIST

Non Patent Literature

[NPL 1] "A Study on Method of Visualization for Multiple Network Structure" (ICM Meeting, March 2019)
[NPL 2] "Study on Method of Identifying Affected Equipment to Support Recovery Operation in a Large-scale Disaster" (ICM Meeting, January 2020)

SUMMARY OF THE INVENTION

Technical Problem

When a failure location is specified using the technique disclosed in NPL 2 described above by specifying a physical layer object that is multiply used by a logical layer in an apparatus, a core wire, a building, or a cable on a physical layer to be a cause of a failure on the logical layer, a physical resource such as a housing building or a high-order apparatus in which a plurality of failure passes are housed in a communication network is likely to be specified as a candidate of a suspicious facility as the failure location. In other words, there is a possibility that a plurality of physical resources of which a degree of multiplicity is the same may end up being specified as a failure location.

The present invention has been made in consideration of the circumstances described above and an object thereof is to provide a network management apparatus, a method, and a program capable of specifying, in detail, a candidate of a facility to be a cause of a failure having occurred on a logical layer of a communication network.

Means for Solving the Problem

A network management apparatus according to an aspect of the present invention includes: a storage apparatus which stores information indicating a correspondence relationship among an information object related to a logical layer of a network configuration, an information object related to a physical layer, and an information object related to a facility layer that is an object in which the information object related to the physical layer is housed; an acquiring unit which acquires, from the storage apparatus, an information object related to a plurality of occurrence paths of a failure in the logical layer of the network configuration; and a retrieving unit which retrieves, as a candidate of a facility to be a failure cause, information objects related to the facility layer and the physical layer commonly associated with the information object related to the plurality of occurrence paths of the failure having been acquired by the acquiring unit among information objects related to the facility layer stored in the storage apparatus, which calculates, for each of the retrieved information objects related to the candidate of a facility to be the failure cause, the number of information objects which are associated with the object and which are related to the plurality of occurrence paths of the failure as a multiplicity, and which calculates, for each of the retrieved information objects related to the candidate of a facility to be the failure cause, a proportion of the multiplicity with respect to the number of information objects in the logical layer which are affected when the failure occurs in the object.

A network management method according to an aspect of the present invention is a network management method carried out by a network management apparatus including: a storage apparatus which stores information indicating a correspondence relationship among an information object related to a logical layer of a network configuration, an information object related to a physical layer, and an information object related to a facility layer that is an object in which the information object related to the physical layer is housed, the network management method including; acquiring, from the storage apparatus, an information object related to a plurality of occurrence paths of a failure in the logical layer of the network configuration; and retrieving, as a candidate of a facility to be a failure cause, information objects related to the facility layer and the physical layer commonly associated with the acquired information object related to the plurality of occurrence paths of the failure among information objects related to the facility layer stored in the storage apparatus.

Effects of the Invention

According to the present invention, a candidate of a facility to be a cause of a failure having occurred on a logical layer of a communication network can be specified in detail.

BRIEF DESCRIPTION OF DRAWINGS

FIG. 1 is a diagram showing, in a table format, an example of objectification of a facility layer in a network configuration to be applied to a network management apparatus according to an embodiment of the present invention.
FIG. 2 is a diagram showing, in a table format, an example of objectification of a physical layer in a network configuration to be applied to the network management apparatus according to the embodiment of the present invention.

FIG. 3 is a diagram showing, in a table format, an example of objectification of a Logical Device layer in a network configuration to be applied to the network management apparatus according to the embodiment of the present invention.

FIG. 4 is a diagram showing, in a table format, an example of objectification of a communication layer in a network configuration to be applied to the network management apparatus according to the embodiment of the present invention.

FIG. 10 is a diagram showing, in a table format, an example of a retrieval result of a physical resource used by a failure pass in a network configuration to be applied to the network management apparatus according to the embodiment of the present invention.

FIG. 11 is a diagram showing, in a table format, an example of a retrieval result of a facility resource sharing a common failure pass in a network configuration to be applied to the network management apparatus according to the embodiment of the present invention.

FIG. 13 is a diagram showing, in a table format, an example of a failure rate of a physical resource sharing a common failure pass in a network configuration to be applied to the network management apparatus according to the embodiment of the present invention.

FIG. 14 is a diagram showing, in a table format, an example of a candidate of a failure location based on a failure rate of a physical resource sharing a common failure pass in a network configuration to be applied to the network management apparatus according to the embodiment of the present invention.

FIG. 17 is a diagram showing, in a table format, an example of Spec (facility layer and physical layer) of facility information retained by the network management apparatus according to the embodiment of the present invention.

FIG. 18 is a diagram showing, in a table format, an example of Spec (logical layer) of facility information retained by the network management apparatus according to the embodiment of the present invention.

FIG. 20 is a diagram showing, in a table format, an example of a schema of a Specificication table of facility information which is defined by the network management apparatus according to the embodiment of the present invention.

FIG. 21 is a diagram showing, in a table format, an example of a schema of a SpecCharacteristic table of facility information which is defined by the network management apparatus according to the embodiment of the present invention.

FIG. 22 is a diagram showing, in a table format, an example of a schema of an Entity table of facility information which is defined by the network management apparatus according to the embodiment of the present invention.

FIG. 23 is a diagram showing, in a table format, an example of a schema of a CharacteristicValue table of facility information which is defined by the network management apparatus according to the embodiment of the present invention.

FIG. 27 is a diagram showing, in a table format, an example of types of an array of failure location Entities to be applied by the network management apparatus according to the embodiment of the present invention.

FIG. 33 is a diagram showing, in a table format, an example of types of a multiple/failure rate Entity to be applied by the network management apparatus according to the embodiment of the present invention.

FIG. 34 is a diagram showing, in a table format, an example of an array of failure location Entities to be applied by the network management apparatus according to the embodiment of the present invention.

DESCRIPTION OF EMBODIMENT

Figure 5:
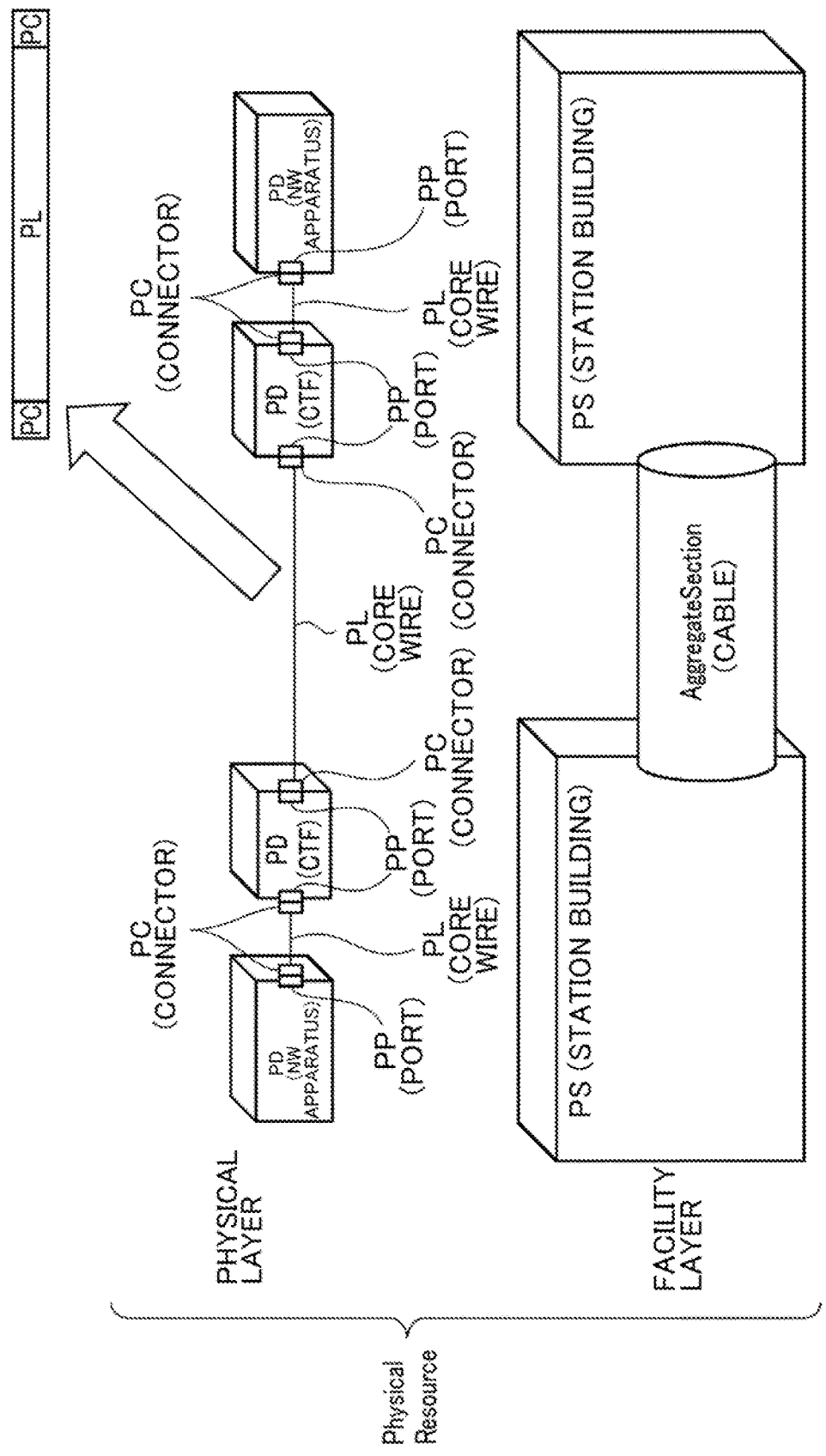
FIG. 5 is a diagram showing an application example of a facility Entity and a physical Entity to be applied to the network management apparatus according to the embodiment of the present invention.

Hereinafter, an embodiment of the present invention will be described with reference to the drawings.

In a network management apparatus according to an embodiment of the present invention, each constituent element of a facility layer, a physical layer, and a logical layer of a communication network is objectified using a unified information object (hereinafter, simply referred to as an object).

In addition, the network management apparatus uses a connection between respective objects to specify, in the facility layer and the physical layer, a candidate of a facility that is a cause of a failure having occurred in the logical layer. An object of the facility layer houses an object of the physical layer.

Accordingly, a candidate of a facility to be a cause of a failure having occurred in a network constituted by a plurality of layers with different protocols and media types can be specified.

Next, an outline of the network management apparatus according to the embodiment of the present invention will be described in (1) to (13) below.

(1) The network management apparatus objectifies, according to an object (Spec, Entity (information object)) based on conventional art, a target NW in a descending order from an upper layer in a logical layer, a physical layer, and a facility layer.

The facility layer is, for example, a building or a cable. In the present embodiment, a building and a communication cable in the facility layer are respectively retained as a building object and a cable object. The building is not particularly limited as long as the building is a building or a facility which houses a communication apparatus. In addition, the cable is not particularly limited as long as the cable is a facility which houses a communication medium.

The physical layer is, for example, a network apparatus, a communication port, or a communication medium. In the present embodiment, a network apparatus, a communication port, and a communication medium in the physical layer are respectively retained as an apparatus object, a port object, and a medium object.

The logical layer corresponds to, for example, a point object and a line or plane object. In the present embodiment, a generation location or a termination of communication in the logical layer is retained as a point object, and communication between such point objects and a communication-enabled range between the point objects are respectively retained as a line or plane object.

The physical layer and the facility layer described above may be referred to as a physical layer and a facility layer in a narrow sense which are included in a physical layer in a broad sense.

(2) An operator designates a plurality of line objects that corresponding to a communication pass on which a failure has occurred (sometimes referred to as a failure pass) and sets a failed state.

(3) The network management apparatus acquires point objects constituting the line object designated in (2).

(4) The network management apparatus iteratively retrieves point objects of a lower layer included in the point object acquired in (3) and interrupts processing when there are no point objects.

(5) The network management apparatus acquires a port object included in point objects obtained by the time of interruption of processing in (4).

(6) The network management apparatus retrieves an apparatus object and a medium object belonging to the port object acquired in (5).

(7) The network management apparatus acquires a building object including the apparatus object (a building object housing the apparatus object) acquired in (6).

(8) The network management apparatus acquires a cable object including the medium object (a cable object housing the medium object) acquired in (6).

(9) The network management apparatus performs the procedures of (3) to (8) with respect to the plurality of line objects designated in (2) and acquires a building object, a cable object, an apparatus object, and a medium object used by the line objects.

(10) Among building objects, cable objects, apparatus objects, and medium objects commonly used by line objects, there are those multiply used by other line objects. The network management apparatus retains and outputs the number of multiple uses (multiplicity) and relevant objects of the facility and physical layers.

(11) The network management apparatus calculates, with respect to the building object, the cable object, the apparatus object, and the medium object acquired in (9), a proportion (failure rate) of the number of line objects (multiplicity) in which a failure has occurred with respect to the number of communication passes that are affected when a failure occurs in the physical resource.

(12) The network management apparatus outputs a multiplicity and a failure rate for each object of the facility and physical layers retained in (10).

(13) The network management apparatus highlights and displays the objects acquired in (9) in accordance with the multiplicity and the failure rate of each object.

Next, objectification of a network configuration will be described. A method of objectification of a facility layer will now be described. The objectification is also described in, for example, Japanese Patent Application No. 2018-196853 and PCT/JP2019/040978.

FIG. 1 is a diagram showing, in a table format, an example of objectification of a facility layer in a network configuration to be applied to a network management apparatus according to an embodiment of the present invention.

As shown in FIG. 1, due to application of a PS (Physical Structure) Entity and an AS (Aggregate Section) Entity, the configuration of the facility layer is retained in a unified format.

As shown in FIG. 1, Entity names in the facility layer are classified into PS and AS.

As shown in FIG. 1, PS signifies a facility such as a housing building, or a manhole. Various "attributes: description" related to a PS are as follows.

(First) status: an attribute indicating a state of the PS Entity (normal: true, failure: false)

(Second) pdList: an array of PD Entities included in the PS Entity (Third) asList: an array of AS Entities included in the PS Entity (Fourth) Position: two-dimensional coordinates indicating a position of the PS Entity As shown in FIG. 1, an AS (Aggregate Section) signifies a cable, a communication line, a cable tunnel/service tunnel, or the like. Various "attributes: description" related to an AS are as follows.

(First) status: an attribute indicating a state of the AS Entity (normal: true, failure: false)

(Second) plList: an array of PL Entities included in the AS Entity (Third) position: two-dimensional coordinates indicating a position of the AS Entity A PS of the facility layer corresponds to the building object described above, and an AS of the facility layer corresponds to the cable object described above.

Next, objectification of a physical layer will be described.

FIG. 2 is a diagram showing, in a table format, an example of objectification of a physical layer in a network configuration to be applied to the network management apparatus according to the embodiment of the present invention.

As shown in FIG. 2, due to application of a PD (Physical Device) Entity, a PP (Physical Port) Entity, a PL (Physical Link) Entity, and a PC (Physical Connector) Entity, the configuration of the physical layer is retained in a unified format.

As shown in FIG. 2, Entity names in the physical layer are classified into PD, PP, PL, and PC.

As shown in FIG. 2, a PD signifies an apparatus. Various "attributes: description" related to a PD are as follows.

(First) status: an attribute indicating a state of the PD (normal operation: true, abnormal operation: false)

(Second) ppList: an array of PPs included in the PD (Third) position: two-dimensional coordinates indicating a position of the PD PP signifies a communication port included in the apparatus. Various "attributes: description" related to a PP are as follows.

(First) status: an attribute indicating a state of the PP (normal operation: true, abnormal operation: false)

(Second) position: two-dimensional coordinates indicating a position of the PD

PL signifies a core wire of the cable. Various "attributes: description" related to a PL are as follows.

(First) status: an attribute indicating a state of the PL (normal operation: true, abnormal operation: false)

(Second) pcList: an array of PCs included in the PL

PC signals a connector for connecting the cable. Various "attributes: description" related to a PC are as follows.

(First) status: an attribute indicating a state of the PC (normal operation: true, abnormal operation: false)

(Second) ppList: an array of PPs included in the PC

A PD on the physical layer corresponds to the apparatus object described above, a PP on the physical layer corresponds to the port object described above, and a PL and a PC on the physical layer correspond to the medium object described above.

Next, objectification of a logical layer will be described.

FIGS. 3 and 4 are diagrams showing, in a table format, an example of objectification of a logical layer in a network configuration to be applied to the network management apparatus according to the embodiment of the present invention.

As shown in FIGS. 3 and 4, due to application of a TPE (Termination Point Encapsulation) Entity, an NFD (Network Forwarding Domain) Entity, a TL (Topological Link) Entity, and an FRE (Forwarding Relationship Encapsulation) (LC (Link Connect), XC (Cross(X) Connect), and NC (Network Connect)) Entity, a configuration of a logical layer is retained in a unified format.

As shown in FIG. 4, an FRE Entry is classified into an LC (Link Connect) Entity, an XC (Cross(X) Connect) Entity, and an NC (Network Connect) Entity.

A TL signifies connectivity (in a Logical Device layer) between apparatuses. Various "attributes: description" related to a TL are as follows.

(First) endPointList: an array of TPE Entities constituting the TL Entity (Second) status: an attribute indicating a state of the TL Entity (normal operation: true, abnormal operation: false)

An NFD signifies a transferable range (in a Logical Device layer) in an apparatus. Various "attributes: description" related to an NFD are as follows.

(First) endPointList: an array of TPE Entities constituting the NFD Entity (Second) Status: an attribute indicating a state of the NFD Entity (normal operation: true, abnormal operation: false)

A TPE signifies a termination of communication. Various "attributes: description" related to a TPE are as follows.

(First) tpeRefList: an array of TPE Entities including a TPE Entity of a corresponding lower layer (1 array in the embodiment)

(Second) ppRefList: an array of PP Entities corresponding to the TPE Entity (1 array in the embodiment)

(Third) status: an attribute indicating a state of the TPE Entity (normal operation: true, abnormal operation: false)

(Fourth) layerName: a name of the layer

A TL in the logical layer corresponds to the line object described above. An NFD in the logical layer corresponds to the line object or the plane object described above. A TPE in the logical layer corresponds to the point object described above.

An LC in an FRE signifies connectivity (in a communication layer) between apparatuses. Various "attributes: description" related to an LC are as follows.

(First) endPointList: an array of TPE Entities constituting the LC Entity (Second) status: an attribute indicating a state of the LC Entity (normal operation: true, abnormal operation: false)

(Third) layerName: a name of the layer

An XC signifies connectivity (in a communication layer) inside an apparatus. Various "attributes: description" related to an XC are as follows.

(First) endPointList: an array of TPE Entities constituting the XC Entity (Second) status: an attribute indicating a state of the XC Entity (normal operation: true, abnormal operation: false)

(Third) layerName: a name of the layer

An NC signifies End-End connectivity (in a communication layer) which is formed by an LC and an XC. Various "attributes: description" related to an XC are as follows.

(First) endPointList: an array of TPE Entities constituting the LC or the XC (Second) status: an attribute indicating a state of the NC Entity (normal operation: true, abnormal operation: false)

(Third) userList: an array of character strings retaining a subscriber name or an URL (Uniform Resource Locator) of an IF (interface) for acquiring a subscriber name (Fourth) layerName: a name of the layer An LC and an XC in the logical layer corresponds to the line object or the plane object described above. In addition, an NC in the logical layer corresponds to a communication object having an array of point objects storing all point objects between a start point and an end point on the logical layer.

Next, an application example of a facility Entity and a physical Entity will be described. FIG. 5 is a diagram showing an application example of a facility Entity and a physical Entity to be applied to the network management apparatus according to the embodiment of the present invention.

As shown in FIG. 5, a Physical Resource is classified into a physical layer and a facility layer.

In the example shown in FIG. 5, the physical layer of the Physical Resource has a PD (NW apparatus), a PD (CTF (Cable termination Frame: a termination apparatus of an optical fiber)), a PL (core wire), a PC (connector), and a PP (port). The PD (NW apparatus) and the PD (CTF) include the PP (port) and the PC (connector) is attached to both ends of the PL (core wire).

The PD (NW apparatus) and the PD (CTF) can communicate with each other when the PP (port) on the PD (NW apparatus) side is connected to the PC (connector) at one end of the PL (core wire) and the PP (port) on the PD (CTF) side is connected to the PC (connector) at the other end of the PL (core wire). The same applies to a connection between PDs (CTFs).

In the example shown in FIG. 5, the facility layer of the Physical Resource has a PS (station building), a PD (NW apparatus), a PD (CTF), and an Aggregate Section (cable).

The Aggregate Section is an object having the PL (core wire) in plurality.

In the example shown in FIG. 5, the PS (station building) is provided with the PD (NW apparatus) and the PD (CTF). Accordingly, PSs (station buildings) can communicate with each other. For example, the PD (CTF) inside a first PS (station building) and the PD (CTF) inside a second PS (station building) become capable of PS (station building) communication via the Aggregate Section (cable).

Figure 6:
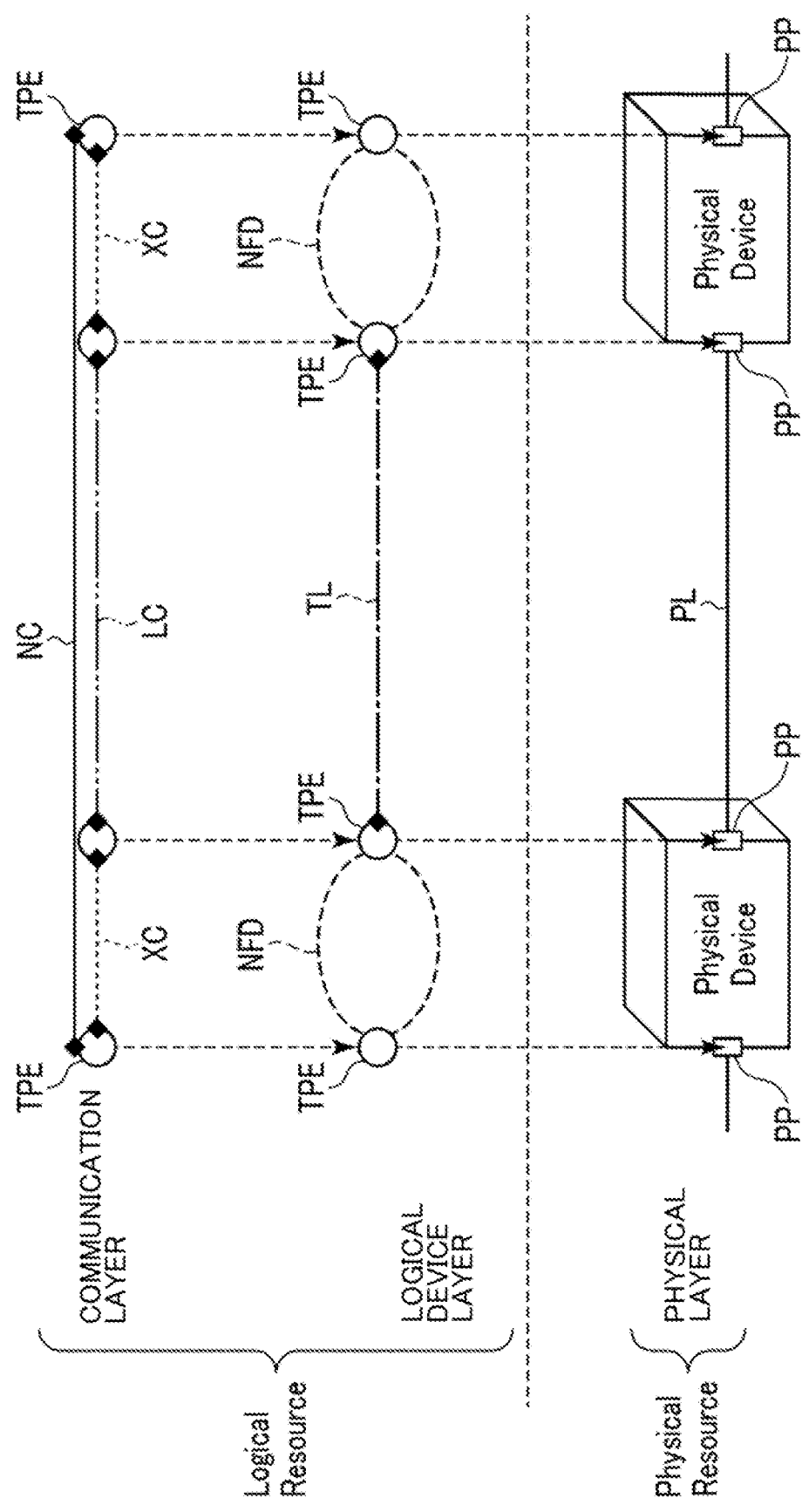
FIG. 6 is a diagram showing an application example of a physical Entity and a logical Entity to be applied to the network management apparatus according to the embodiment of the present invention.

Next, an application example of a physical Entity and a logical Entity will be described. FIG. 6 is a diagram showing an application example of a physical Entity and a logical Entity to be applied to the network management apparatus according to the embodiment of the present invention.

In the example shown in FIG. 6, a Physical Resource has a physical layer and a Logical Resource has a communication layer and a Logical Device layer. The Logical Device layer corresponds to an object in a lower layer with respect to the logical layer. The physical layer corresponds to an object in a lower layer with respect to the Logical Device layer. In the example shown in FIG. 6, in the physical layer, PPs in a Physical Device are respectively connected to PCs at one end and another end of a PL.

The corresponding logical layer has a TPE, an XC, and an LC, and the Logical Device layer has a TPE, an NFD, and a TL. In FIG. 6, an object is depicted by an arrow in a lower layer with respect to a point object in a given layer.

In the example shown in FIG. 6, the Physical Device in the physical layer respectively corresponds to the XC in the logical layer and the NFD in the Logical Device layer.

In the example shown in FIG. 6, the PP in the Physical Device layer respectively corresponds to the TPE in the logical layer and the TPE in the Logical Device layer. The same applies to the PC attached to the PL.

In the example shown in FIG. 6, the PL in the physical layer respectively corresponds to the LC in the logical layer and the TL in the Logical Device layer. In addition, in the example shown in FIG. 6, one NC is formed by the XC and the LC in the logical layer.

Figure 7:
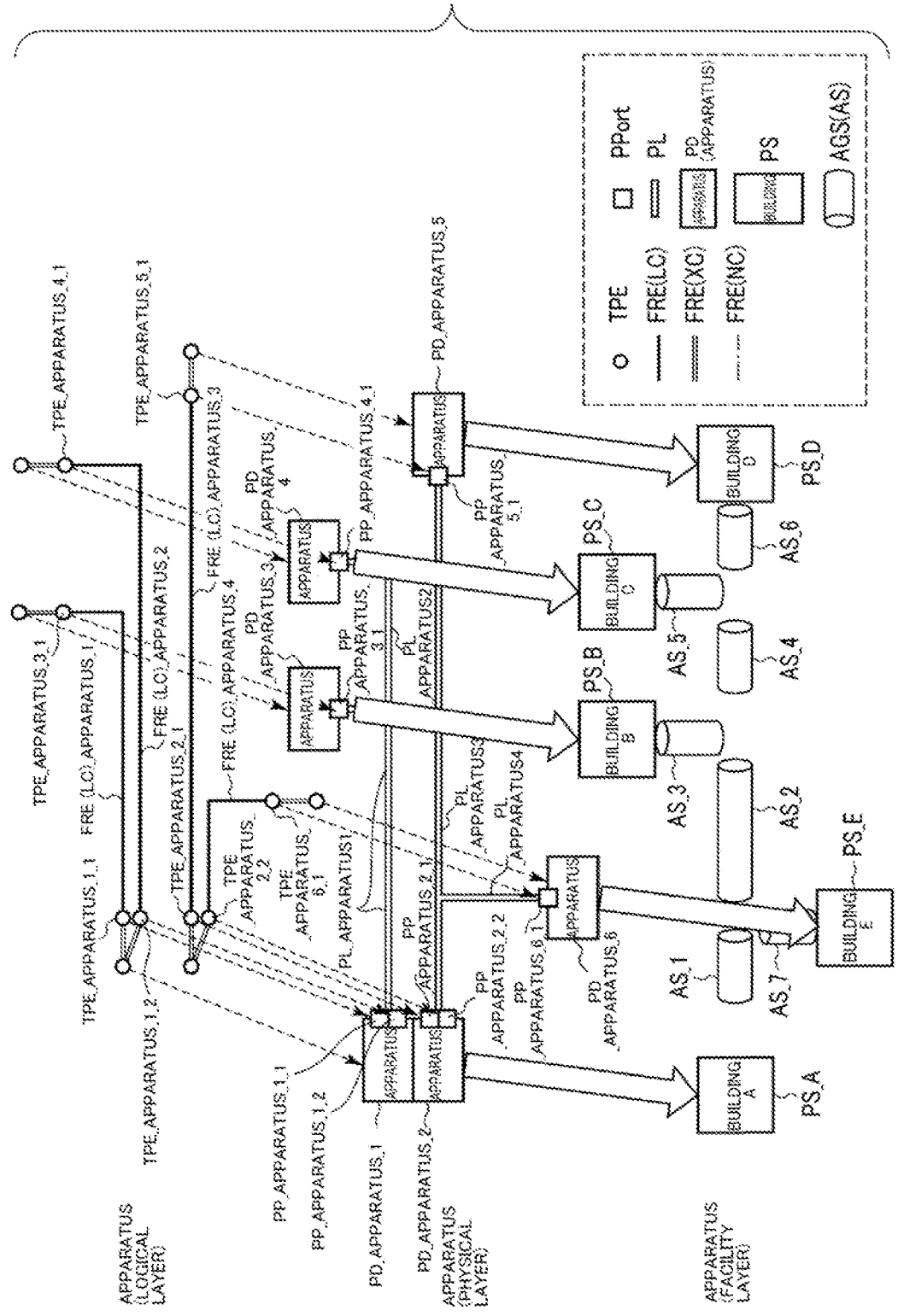
FIG. 7 is a diagram showing an example of objectification of a network configuration to be applied to the network management apparatus according to the embodiment of the present invention.

Next, an example of objectification of a network configuration will be described. FIG. 7 is a diagram showing an example of objectification of a network configuration to be applied to the network management apparatus according to the embodiment of the present invention.

FIG. 7 shows, with an apparatus provided in a building A as an upper device, facility, physical, and logical layers of a network configuration between the apparatus provided in the building A and apparatuses provided in buildings B to E. The Logical Device layer will not be described.

In the example shown in FIG. 7, the logical layer on which the apparatuses are realized is provided with TPEs and FREs (LC, XC, and NC) including TPE_apparatuses_1_1, 1_2, 2_1, 2_2, 3_1, 4_1, 5_1, and 6_1 and FRE (LC)_apparatuses_1 to 4. One end of the FRE (LC)_apparatus_1 is provided with the TPE_apparatus_1_1 and another end is provided with the TPE_apparatus_3_1. One end of the (LC)_apparatus_2 is provided with the TPE_apparatus_1_2 and another end is provided with the TPE_apparatus_4_1. One end of the FRE (LC)_apparatus_3 is provided with the TPE_apparatus_2_1 and another end is provided with the TPE_apparatus_5_1. One end of the FRE (LC)_apparatus_4 is provided with the TPE_apparatus_2_2 and another end is provided with the TPE_apparatus_6_1.

The physical layer on which the apparatuses are realized is provided with PPs, PDs, and PLs including PP_apparatuses_1_1, 1_2, 2_1, 2_2, 3_1, 4_1, 5_1, and 6_1, PD_apparatuses_1 to 6, and PL_apparatuses_1 to 4. One end of the PL_apparatus_1 is provided with the PD_apparatus_1 and another end is provided with the PD_apparatus_3. One end of the PL_apparatus_2 is provided with the PD_apparatus_1 and another end is provided with the PD_apparatus_4. One end of the PL_apparatus_3 is provided with the PD_apparatus_2 and another end is provided with the PD_apparatus_5. One end of the PL_apparatus_4 is provided with the PD_apparatus_2 and another end is provided with the PD_apparatus_6.

The facility layer on which the facilities are realized is provided with PSs and ASs including PSs_A to E and ASs__1 to 7. The ASs__1, 2, 4, and 6 are connected in series. The AS_3 is connected to a connecting portion of the ASs__2 and 4, the AS_5 is connected to a connecting portion of the ASs__4 and 6, and the AS_7 is connected to a connecting portion of the ASs__1 and 2.

The PS_A and the PS_B are connected by the ASs__1 to 3. The PS_A and the PS C are connected by the ASs__1, 2, 4, and 5. The PS_A and the PS_D are connected by the ASs__1, 2, 4, and 6. The PS_A and the PS_E are connected by the ASs__1 and 7.

The TPE_apparatuses_1_1, 1_2, 2_1, 2_2, 3_1, 4_1, 5_1, and 6_1 of the logical layer correspond one-to-one with the PP_apparatuses_1_1, 1_2, 2_1, 2_2, 3_1, 4_1, 5_1, and 6_1 of the physical layer.

The FRE (LC)_apparatuses_1 to 4 of the logical layer correspond one-to-one with the PL_apparatuses_1 to 4 of the physical layer. The PL_apparatus_1 corresponds to the ASs__1 to 3 of the facility layer. The PL_apparatus_2 corresponds to the ASs__1, 2, 4, and 5 of the facility layer. The PL_apparatus_3 corresponds to the ASs__1, 2, 4, and 6 of the facility layer. The PL_apparatus_4 corresponds to the ASs__1 and 7 of the facility layer.

The PD_apparatuses_1 and 2 of the physical layer correspond to the PS_A of the facility layer. The PD_apparatuses_3 to 6 of the physical layer correspond one-to-one with the PSs B, C, D, and E of the facility layer.

Figure 8:
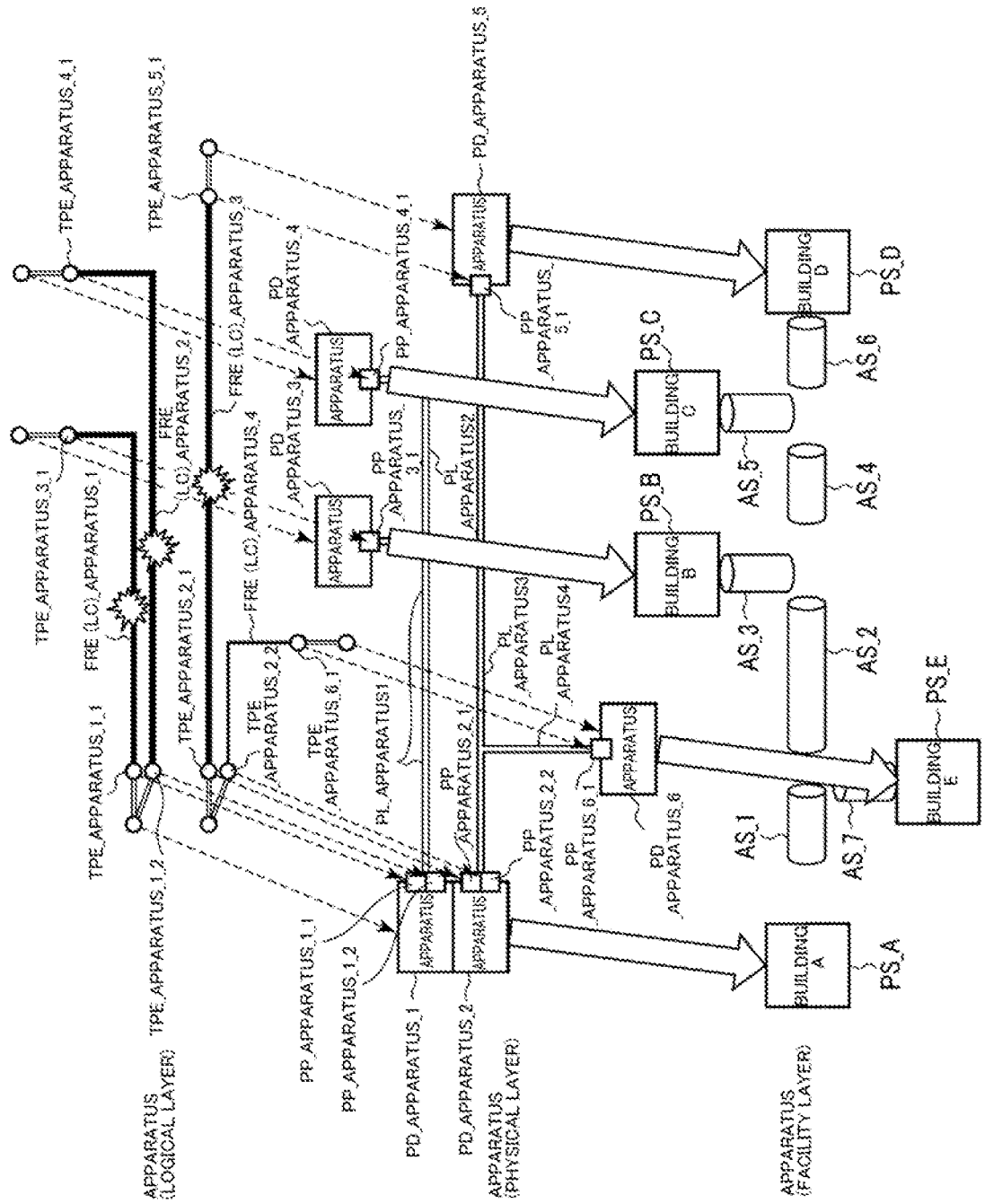
FIG. 8 is a diagram showing an example of designation of a failure pass in a network configuration to be applied to the network management apparatus according to the embodiment of the present invention.

Next, an example of designation of a failure pass related to physical resource retrieval will be described. FIG. 8 is a diagram showing an example of designation of a failure pass in a network configuration to be applied to the network management apparatus according to the embodiment of the present invention.

Here, as shown in FIG. 8, it is assumed that a failure has occurred in the FRE (LC)_apparatuses_1, 2, and 3 on the apparatus (logical layer). In the present embodiment, the FRE (LC)_apparatuses_1, 2, and 3 are designated as three failure passes, and a building, a cable, and an apparatus cable which are physical resources used by the passes are retrieved.

Figure 9:
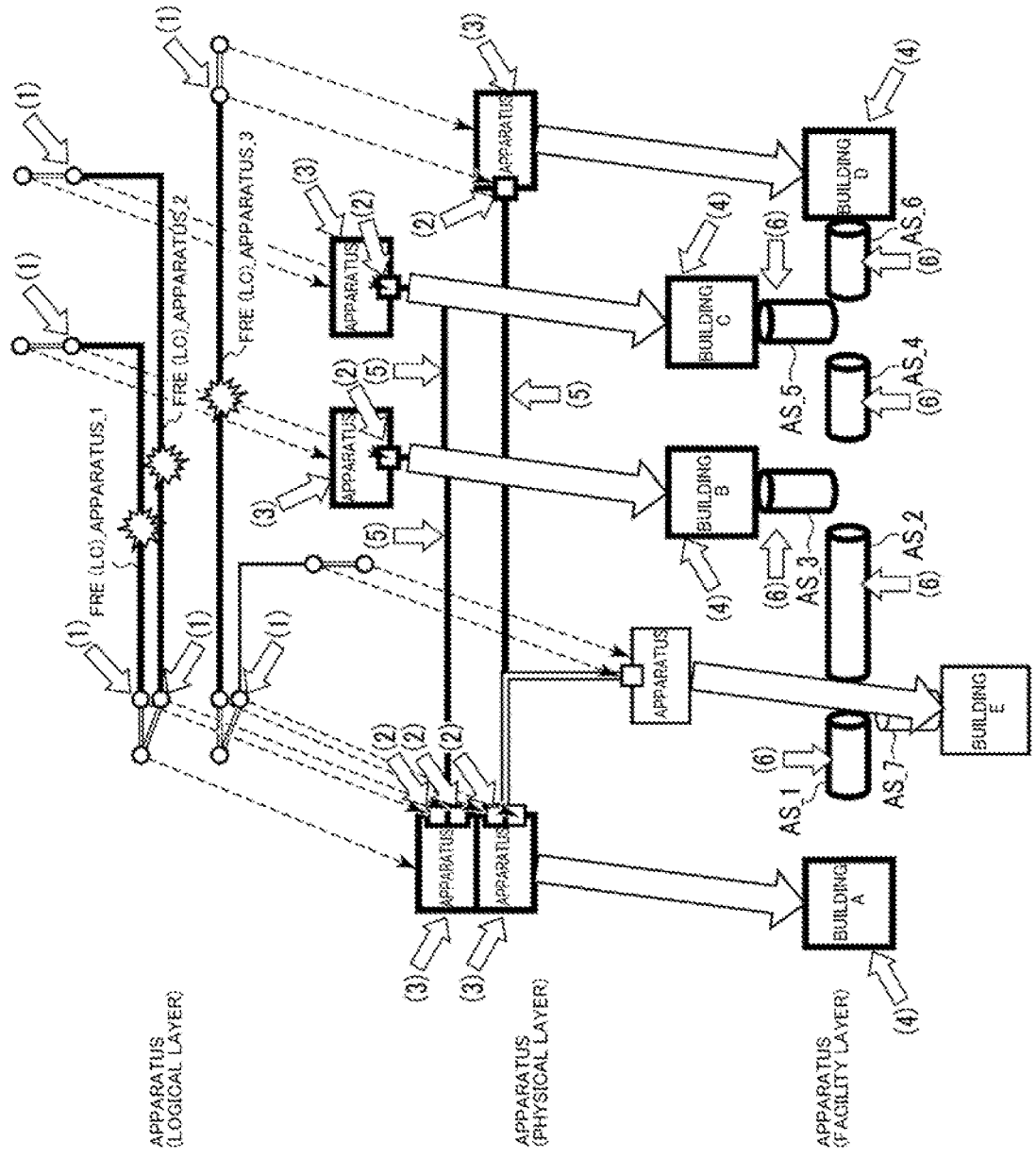
FIG. 9 is a diagram showing an example of retrieval of a physical resource used by a failure pass in a network configuration to be applied to the network management apparatus according to the embodiment of the present invention.

FIG. 9 is a diagram showing an example of retrieval of a physical resource used by a failure pass in a network configuration to be applied to the network management apparatus according to the embodiment of the present invention.

The physical resources used by a failure pass are retrieved according to (1) to (6) below.

(1) A physical resource retrieving unit 15 retrieves TPEs constituting the three failure passes (FREs (LCs)).

(2) The physical resource retrieving unit 15 retrieves a PPort (PP) corresponding to the TPE obtained in (1).

(3) The physical resource retrieving unit 15 retrieves a PD to which the PPort obtained in (2) belongs.

(4) The physical resource retrieving unit 15 retrieves a PS to which the PD obtained in (3) belongs.

(5) The physical resource retrieving unit 15 retrieves a PL at which the PPort obtained in (2) terminates.

(6) The physical resource retrieving unit 15 retrieves an AS to which the PL obtained in (5) belongs.

FIG. 10 is a diagram showing, in a table format, an example of a retrieval result of a physical resource used by a failure pass in a network configuration to be applied to the network management apparatus according to the embodiment of the present invention.

Results retrieved according to (1) to (6) described above with respect to the physical resources used by the failure pass FRE (LC)_apparatuses_1, 2, and 3 shown in FIG. 9 are as follows.

Results retrieved with respect to the FRE (LC)_apparatus_1

Results retrieved according to (1): TPE_apparatuses_1_1 and 3_1

Results retrieved according to (2): PP_apparatuses_1_1 and 3_1

Results retrieved according to (3): PD_apparatuses_1 and 3

Results retrieved according to (4): PS_A and B

Results retrieved according to (5): PL_apparatus_1

Results retrieved according to (6): ASs__1, 2, and 3

Results retrieved with respect to the FRE (LC)_apparatus_2

Results retrieved according to (1): TPE_apparatuses_1_2 and 4_1

Results retrieved according to (2): PP_apparatuses_1_2 and 4_1

Results retrieved according to (3): PD_apparatuses_1 and 4

Results retrieved according to (4): PS_A and C

Results retrieved according to (5): PL_apparatus_2

Results retrieved according to (6): ASs__1, 2, 4, and 5

Results retrieved with respect to the FRE (LC)_apparatus_3

Results retrieved according to (1): TPE_apparatuses_2_1 and 5_1

Results retrieved according to (2): PP_apparatuses_2_1 and 5_1

Results retrieved according to (3): PD_apparatuses_2 and

Results retrieved according to (4): PS_A and D

Results retrieved according to (5): PL_apparatus_3

Results retrieved according to (6): ASs__1, 2, 4, and 6

Next, retrieval of a physical resource commonly (multiply) used by a plurality of failure passes will be described.

FIG. 11 is a diagram showing, in a table format, an example of a retrieval result of a facility resource sharing a common failure pass in a network configuration to be applied to the network management apparatus according to the embodiment of the present invention.

In this case, PSs, ASs, and PDs multiply used by a plurality of failure passes among physical and facility resources used by failure passes are retrieved.

In the example shown in FIG. 11, the PD_apparatus_1 is commonly used by two failure pass FRE (LC)_apparatuses_1 and 2, the AS_4 is commonly used by two failure pass FRE (LC)_apparatuses_2 and 3, and the PS_A and the ASs__1 and 2 are commonly used by three failure pass FRE (LC)_apparatuses_1 to 3 (refer to a, b, and c in FIG. 11). In this case, multiplicity (multiplicity 2 or 3) which corresponds to the number of failure passes being entities of use is indicated (refer to d in FIG. 11). In this case, examples where multiplicity is less than 1 are omitted.

Figure 12:
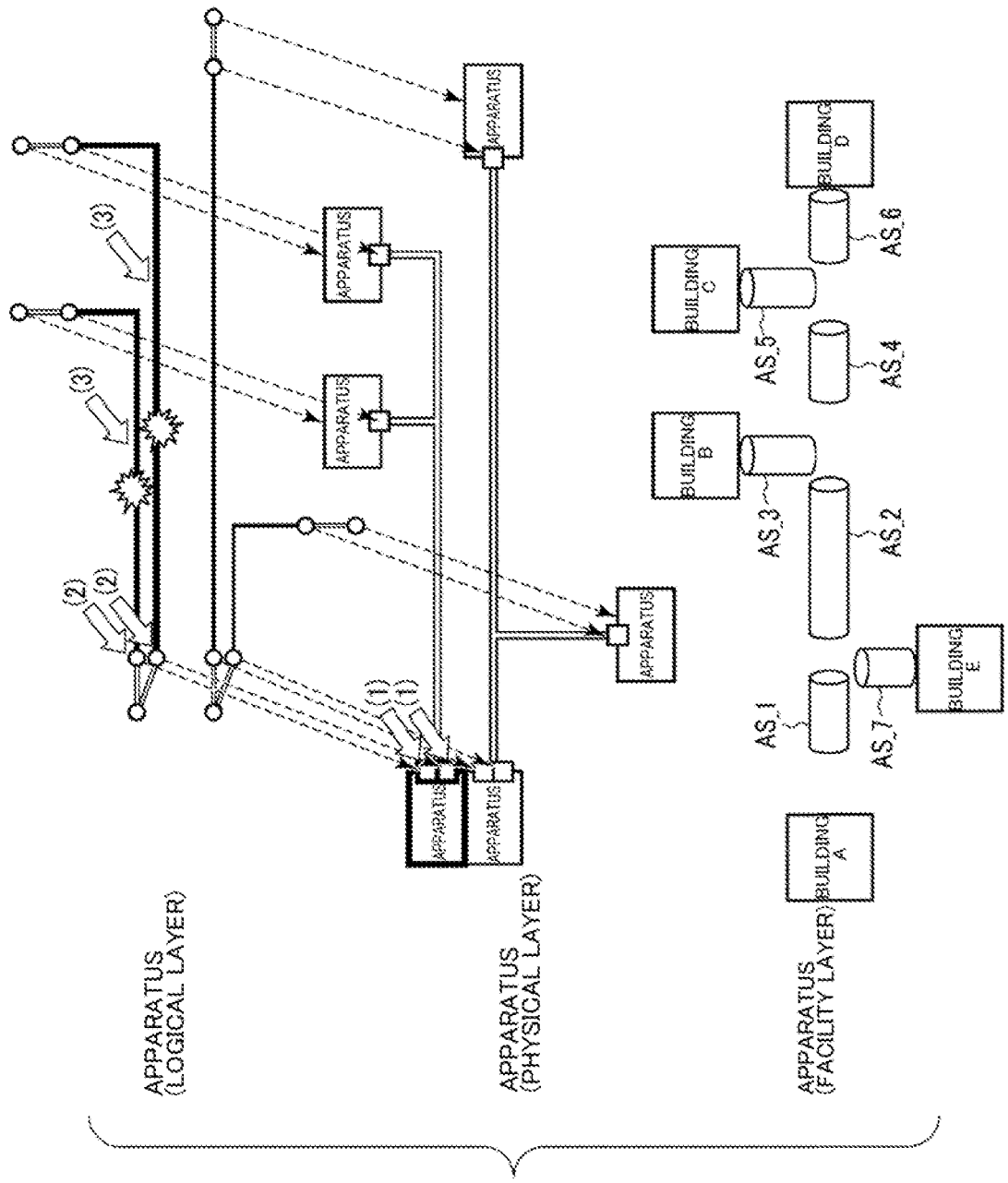
FIG. 12 is a diagram showing an example of specification of a pass that is affected when a failure occurs in a physical resource sharing a common failure pass in a network configuration to be applied to the network management apparatus according to the embodiment of the present invention.

FIG. 12 is a diagram showing an example of specification of a pass that is affected when a failure occurs in a physical resource sharing a common failure pass in a network configuration to be applied to the network management apparatus according to the embodiment of the present invention.

FIG. 13 is a diagram showing, in a table format, an example of a failure rate of a physical resource sharing a common failure pass in a network configuration to be applied to the network management apparatus according to the embodiment of the present invention.

In this case, a failure rate is calculated for each physical resource (PD, PS, and AS) which is commonly used by a plurality of failure passes. The failure rate is represented by expression (1) below. As shown in FIG. 13, information related to a calculated failure rate is constituted by a resource type, a resource name, multiplicity, and a failure rate being associated with each other.

Failure rate=multiplicity/the number of passes affected when a failure occurs in a resource commonly used by a plurality of failure passes  Expression (1)

For example, passes (hereinafter, sometimes referred to as affected passes) that are affected when a failure occurs in a PD commonly used by a plurality of failure passes are specified according to (1) to (3) below.

(1) Retrieve a PP belonging to the PD commonly used by the plurality of failure passes (2) Retrieve a TPE corresponding to the PP retrieved in (1)

(3) Retrieve an FRE (LC) having the TPE retrieved in (2)

Since the affected passes in a case where a failure occurs in the PD_apparatus_1 which is commonly used by a plurality of failure passes as shown in FIG. 11 are the FRE (LC)_apparatuses_1 and 2 as shown in FIG. 12, the number of affected passes is 2. In addition, multiplicity thereof is 2. Therefore, the failure rate is 1.0.

In addition, since the affected passes in a case where a failure occurs in the PS_A or the AS_1 which is commonly used by a plurality of failure passes as shown in FIG. 11 are the FRE (LC)_apparatuses_1 to 4, the number of affected passes is 4. In addition, multiplicity thereof is 3. Therefore, the failure rate is 0.75.

Since the affected passes in a case where a failure occurs in the AS_2 which is commonly used by a plurality of failure passes as shown in FIG. 11 are the FRE (LC)_apparatuses_1 to 3, the number of affected passes is 3. In addition, multiplicity thereof is 3. Therefore, the failure rate is 1.0.

Since the affected passes in a case where a failure occurs in the AS_4 which is commonly used by a plurality of failure passes as shown in FIG. 11 are the FRE (LC)_apparatuses_2 and 3, the number of affected passes is 2. In addition, multiplicity thereof is 2. Therefore, the failure rate is 1.0.

FIG. 14 is a diagram showing, in a table format, an example of a candidate of a failure location based on a failure rate of a physical resource sharing a common failure pass in a network configuration to be applied to the network management apparatus according to the embodiment of the present invention.

Five rows of information shown in FIG. 13 which represent information on a failure rate related to each physical resource commonly used by a plurality of failure passes are subjected to descending order processing in an order of the failure rate and importance, and pieces of information that are promising as a candidate of a failure location can be sorted in upper rows to be presented to a user.

In the example shown in FIG. 14, first, among the five rows of information shown in FIG. 13, a total of three rows of information related to resource names "AS_2", "PS_A", and "AS_1" of which the failure rate is "3" are sorted higher than a total of two rows of information related to resource names "PD_apparatus_1" and "AS_4" of which the failure rate is "2".

Next, among the three rows of information of which the failure rate is "3", the source name "AS_2" having a highest failure rate of "1.0" is sorted highest. Therefore, when there are a plurality of pieces of information with a same multiplicity among the information shown in FIG. 13, information with a high failure rate can be sorted higher to be presented to the user as a promising candidate of a failure location.

Next, a configuration of the network management apparatus will be described.

Figure 15:
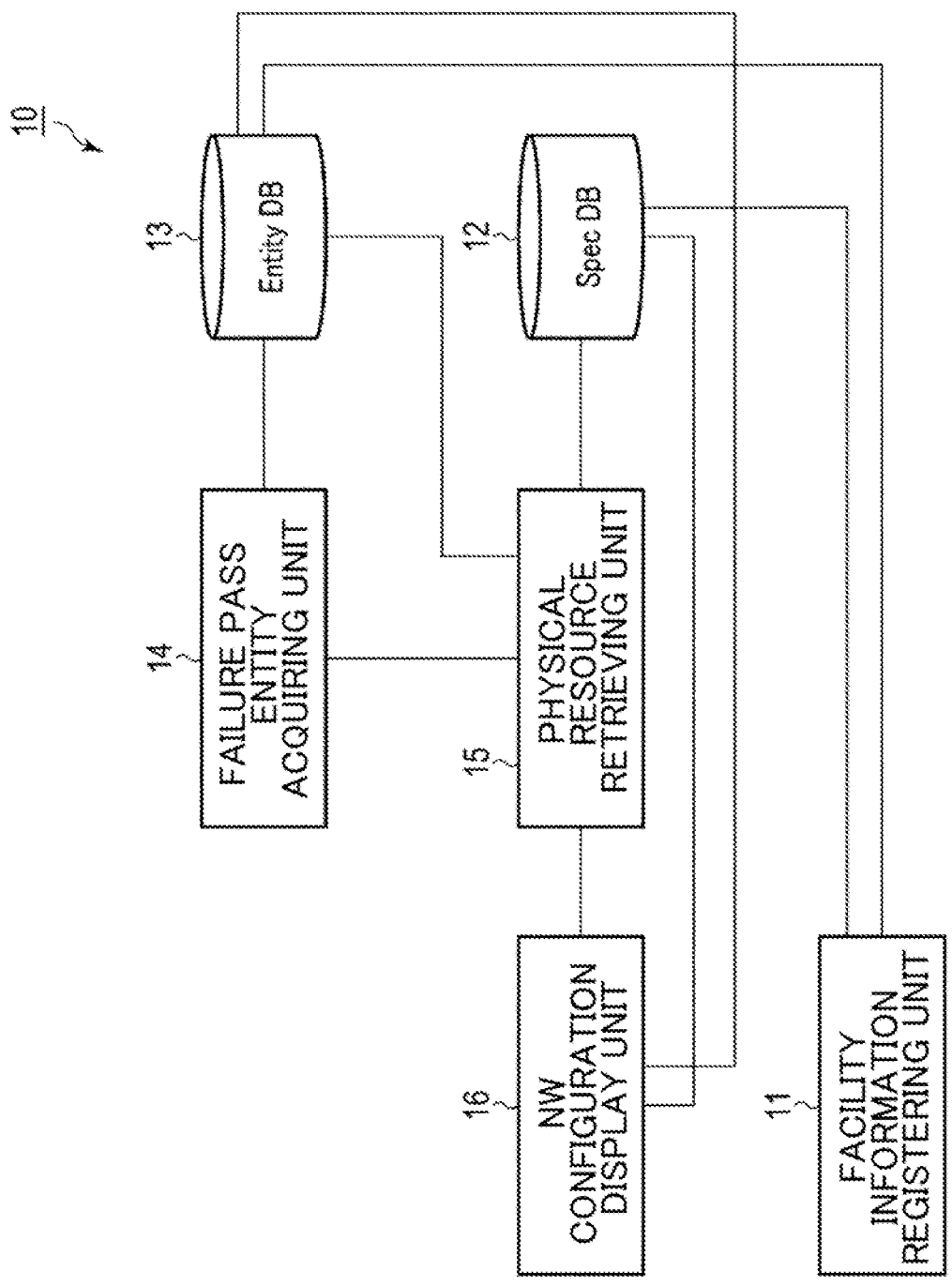
FIG. 15 is a diagram showing an example of a software configuration of the network management apparatus according to the embodiment of the present invention.

FIG. 15 is a diagram showing an example of a functional configuration of the network management apparatus according to the embodiment of the present invention.

In the example shown in FIG. 15, a network management apparatus 10 can be configured as a computer including a central processing unit (CPU), a program memory, and an arithmetic memory. As shown in FIG. 15, as functions necessary for implementing the present embodiment, the network management apparatus 10 includes a facility information registering unit 11, a Spec DB (database) 12, an Entity DB 13, a failure pass Entity acquiring unit 14, a physical resource retrieving unit 15, and an NW configuration display unit 16. Processing performed by these elements will be described later.

The facility information registering unit 11, the failure pass Entity acquiring unit 14, the physical resource retrieving unit 15, and the NW configuration display unit 16 can be realized by having the CPU execute a program stored in a program memory. The Spec DB 12 and the Entity DB 13 can be realized by a storage apparatus such as a non-volatile memory. The NW configuration display unit 16 can be realized by using a display apparatus such as a liquid crystal display.

It should be noted that, although the network management apparatus 10 can be configured by hardware, the network management apparatus 10 can also be realized by a known computer in which a program including procedures shown in flow charts to be described later has been installed via a medium or a communication line and which is either a combination of the computer and the Spec DB 12 and the Entity DB 13 or the computer including the Spec DB 12 and the Entity DB 13. Details of the hardware configuration of the network management apparatus 10 will be described later.

Next, details of the network management apparatus 10 will be described.

Figure 16:
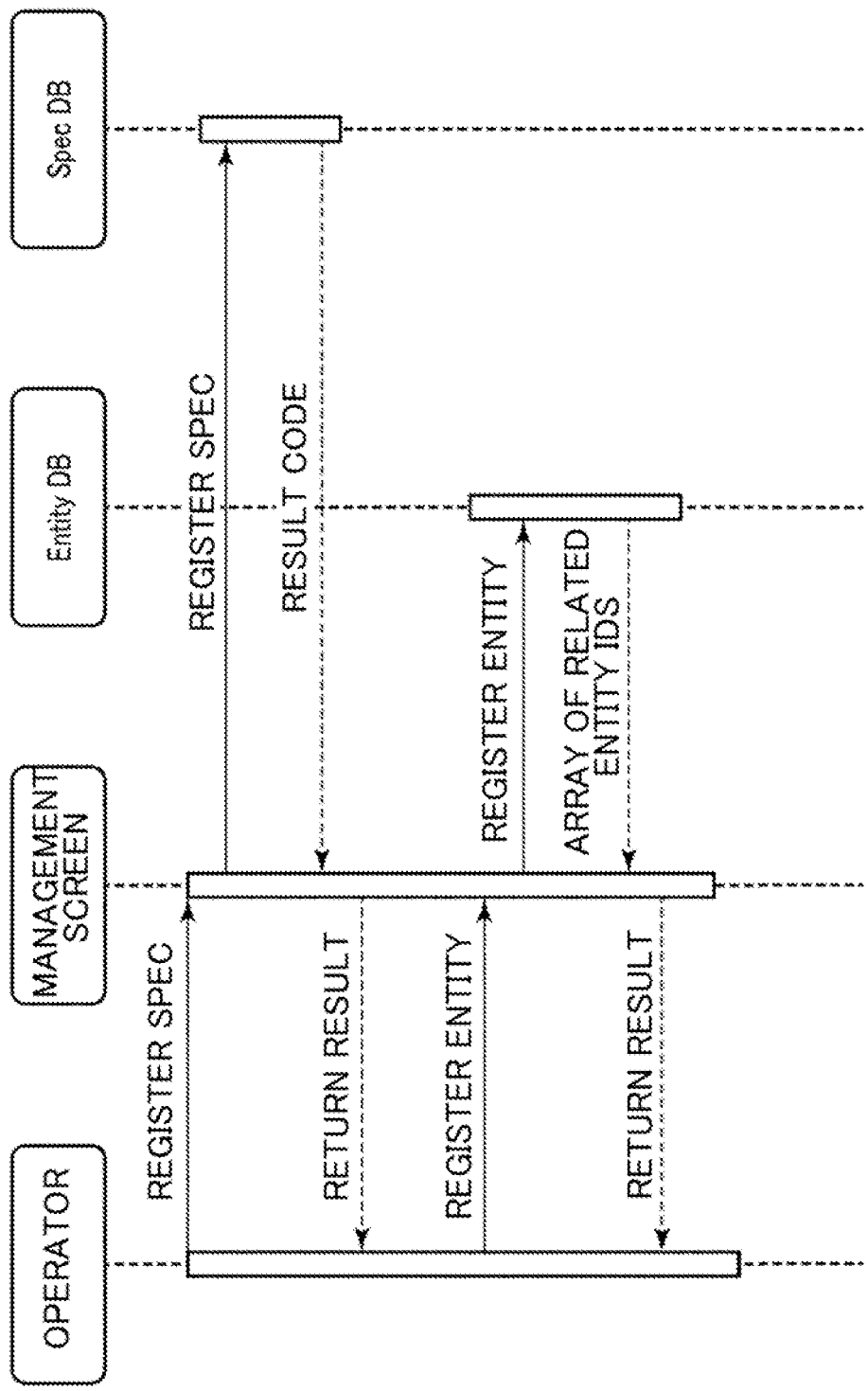
FIG. 16 is a sequence chart showing an example of procedures for registering facility information by the network management apparatus according to the embodiment of the present invention.

First, registration of facility information (Spec (Specification) and an Entity) will be described. FIG. 16 is a sequence chart showing an example of procedures for registering facility information by the network management apparatus according to the embodiment of the present invention.

First, when an operator performs an operation related to the registration of facility information (Spec) along a management screen, the facility information (Spec) is registered to the Spec DB 12 and, as a result of the registration, a code is returned to the management screen and a registration result is returned to an operator-side display screen.

Next, a Spec (physical layer) of the facility information will be described. FIG. 17 is a diagram showing, in a table format, an example of Spec (facility layer and physical layer) of facility information retained by the network management apparatus according to the embodiment of the present invention.

In the physical layer, an attribute that is unique information such as an apparatus name or a cable type is retained in the Spec DB 12 as information in which a Spec (Specification) class (an attribute indicating a characteristic is defined) has been instantiated.

Specifically, the following Spec classes are defined.

The Specs are mainly used to display an NW configuration.

"Spec name: meaning" in the facility layer is as follows.
PS Spec (Physical Structure Specification): an attribute unique to each PS is defined
AS Spec (Aggregate Section Specification): an attribute unique to each AS is defined "Spec name: meaning" in the physical layer is as follows.
PD Spec (Physical Device Specification): an attribute unique to each PD is defined
PP Spec (Physical Port Specification): an attribute unique to each PP is defined
PL Spec (Physical Link Specification): an attribute unique to each PL is defined
PC Spec (Physical Connector Specification): an attribute unique to each PC is defined Next, a Spec (logical layer) of the facility information will be described. FIG. 18 is a diagram showing, in a table format, an example of Spec (logical layer) of facility information retained by the network management apparatus according to the embodiment of the present invention.

In the logical layer, an attribute (a VLAN ID (Virtual LAN IDentifier), an IP address (Internet Protocol address), a wavelength number, or the like) which is unique to each layer is retained in the Spec DB 12 as information in which each Spec class has been instantiated. Specifically, the following Spec classes are defined.

"Spec name: meaning" in the logical layer is as follows.

Figure 19:
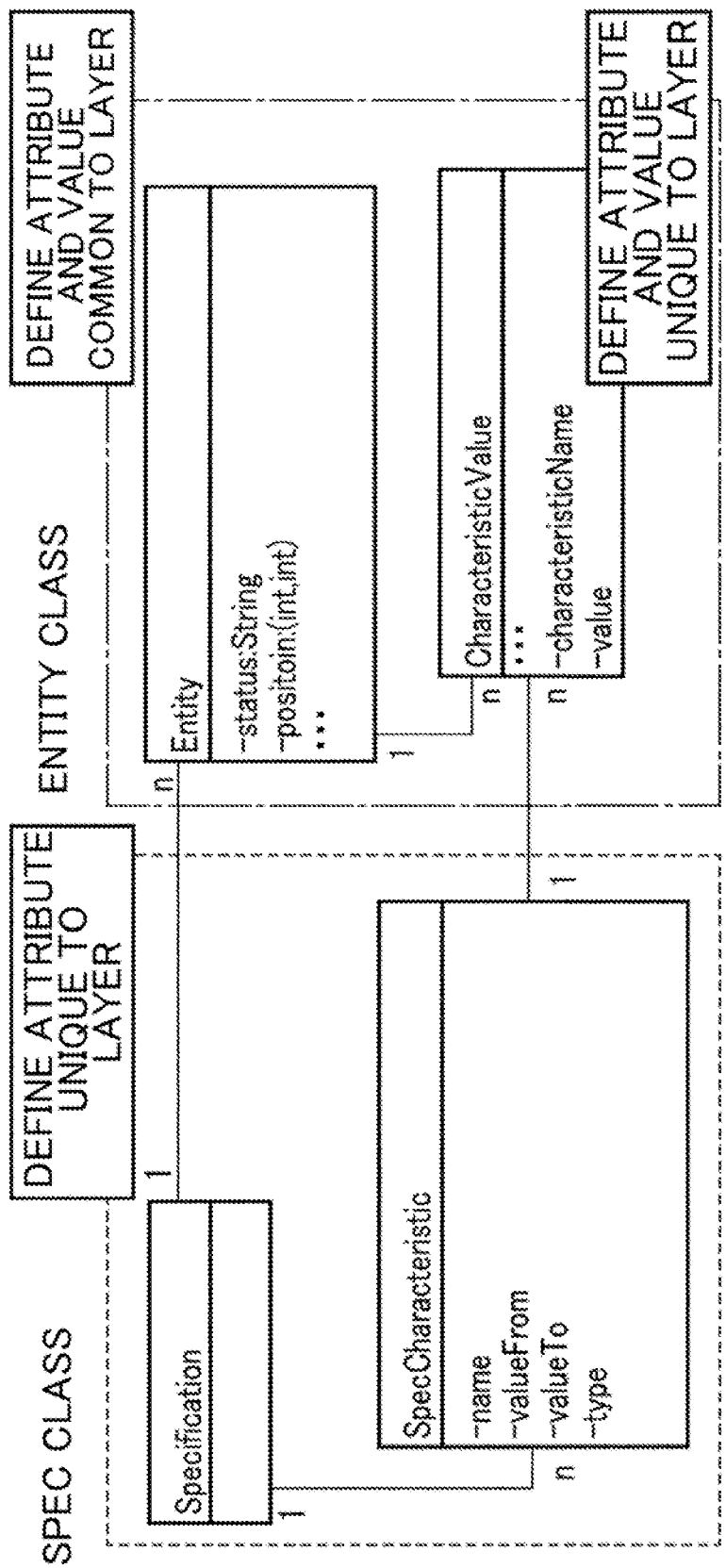
FIG. 19 is a diagram showing an example of use of a Spec class and an Entity class by the network management apparatus according to the embodiment of the present invention.

TL Spec (Topological Link Specification): an attribute unique to each TL is defined NFD Spec (Network Forwarding Domain Specification): an attribute unique to each NFD is defined TPE Spec (Termination Point Encapsulation Specification): an attribute unique to each TPE is defined NC Spec (Network Connection Specification): an attribute unique to each NC is defined LC Spec (Link Connect Specification): an attribute unique to each LC is defined XC Spec (Cross (X) Connect Specification): an attribute unique to each XC is defined Next, a method of use of a Spec class and an Entity class (a class of which an attribute value is defined) will be described. FIG. 19 is a diagram showing an example of use of a Spec class and an Entity class by the network management apparatus according to the embodiment of the present invention.

As shown in FIG. 19, an attribute common to a layer and a value thereof are retained in the Entity DB 13 as information in which an Entity class has been instantiated.

A single Specification class in a Spec class is associated with n-number of SpecCharacteristic classes and n-number of Entity classes. A SpecCharacteristic class includes a name, valueFrom, valueTo, and Type to be described later.

An Entity class includes "status: String" and "position (int, int)". A single Entity class is associated with n-number of CharacteristicValue classes (an external class of the Entity class which stores any one specific characteristic having been realized among characteristics defined in the SpecCharacteristic class).

A CharacteristicValue class includes a CharacteristicName and a Value to be described later.

An attribute name that is unique to the layer is retained in the Spec DB 12 as information in which a SpecCharacteristic class (an external class of a Specification class) has been instantiated.

An attribute value that is unique to the layer is retained in the Spec DB 12 as information in which a CharacteristicValue has been instantiated. It should be noted that an attribute name is defined in the SpecCharacteristic class.

Next, schemas of the Spec DB and the Entity DB will be described. FIG. 20 is a diagram showing, in a table format, an example of a schema of a Specificication table of facility information which is defined by the network management apparatus according to the embodiment of the present invention.

Schemas (column name: type) of the Specificication table retained in the Spec DB 12 are as follows (refer to Specificication in FIG. 19).

Entity: external key

SpecCharacteristic: external key

FIG. 21 is a diagram showing, in a table format, an example of a schema of a SpecCharacteristic table of facility information which is defined by the network management apparatus according to the embodiment of the present invention.

Schemas (column name: type) of the SpecCharacteristic table retained in the Spec DB 12 are as follows (refer to SpecCharacteristic in FIG. 19).

Name: String

ValueFrom: int

ValueTo: int

Type: String

Figure 22:
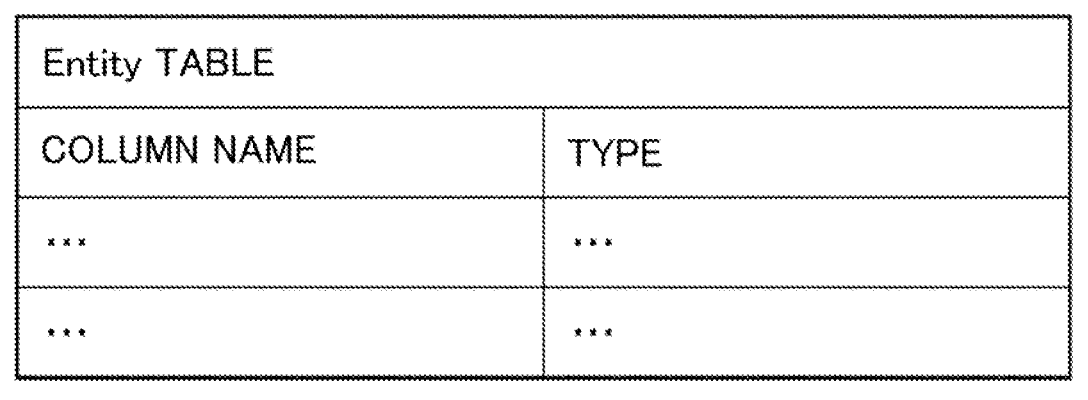

FIG. 22 is a diagram showing, in a table format, an example of a schema of an Entity table of facility information which is defined by the network management apparatus according to the embodiment of the present invention.

Schemas (column name: type) of the Entity table retained in the Entity DB 13 are as defined in Entity.

FIG. 23 is a diagram showing, in a table format, an example of a schema of a CharacteristicValue table of facility information which is defined by the network management apparatus according to the embodiment of the present invention.

Schemas (column name: type) of the CharacteristicValue table retained in the Entity DB 13 are as follows (refer to CharacteristicValue in FIG. 19).

SpecCharacteristic (external key): —

CharacteristicName: String value: String

Next, a registration method of a Spec will be described.

(1) Spec of facility information shown in FIGS. 17 and 18 is created as a table in the Spec DB 12 in formats of Specification and SpecCharacteristic shown in FIG. 19. For example, with respect to PS Spec shown in FIG. 17, the SpecCharacteristic table shown in FIG. 19 is managed as a plurality of tables by an external key. The SpecCharacteristic table is constituted of four attributes (refer to FIG. 19), namely, name (a name of a characteristic), valueFrom (an upper limit of a specific value allowed by the characteristic), valueTo (a lower limit of the specific value allowed by the characteristic), and type (a type of the specific value of the characteristic).

(2) An attribute necessary for a unique value in the logical layer to be stored in the Spec DB 12 is set to the name attribute (refer to FIG. 19) of SpecCharacteristic.

(3) A type set by the name attribute is set to the type attribute (refer to FIG. 19) of SpecCharacteristic.

(4) When a prerequisite for a value to be set to an attribute necessary for a unique value in the logical layer to be stored in the Spec DB 12 is required, the condition is set to the valueFrom and valueTo attributes (refer to FIG. 19) of SpecCharacteristic.

Next, a registration method of an Entity will be described.

(1) The attributes of Entities described in FIGS. 1 to 4 are created as a table in the Entity DB 13. For example, in the case of the PD, PP, or PS Entity (refer to FIGS. 1 and 2), a table is created by schemas constituted of two attributes, namely, a status and coordinates.

(2) A value common to the logical layer is stored in a record of a corresponding table in the Entity DB 13.

(3) With an attribute necessary for a unique value in the logical layer to be stored, an attribute name set to the name attribute of SpecCharacteristic of a corresponding Spec is set to the CharacteristicName attribute of CharacteristicValue and a value thereof is set to the value attribute of CharacteristicValue (refer to FIG. 19).

Next, an input of a failure location or the like will be described.

Figure 24:
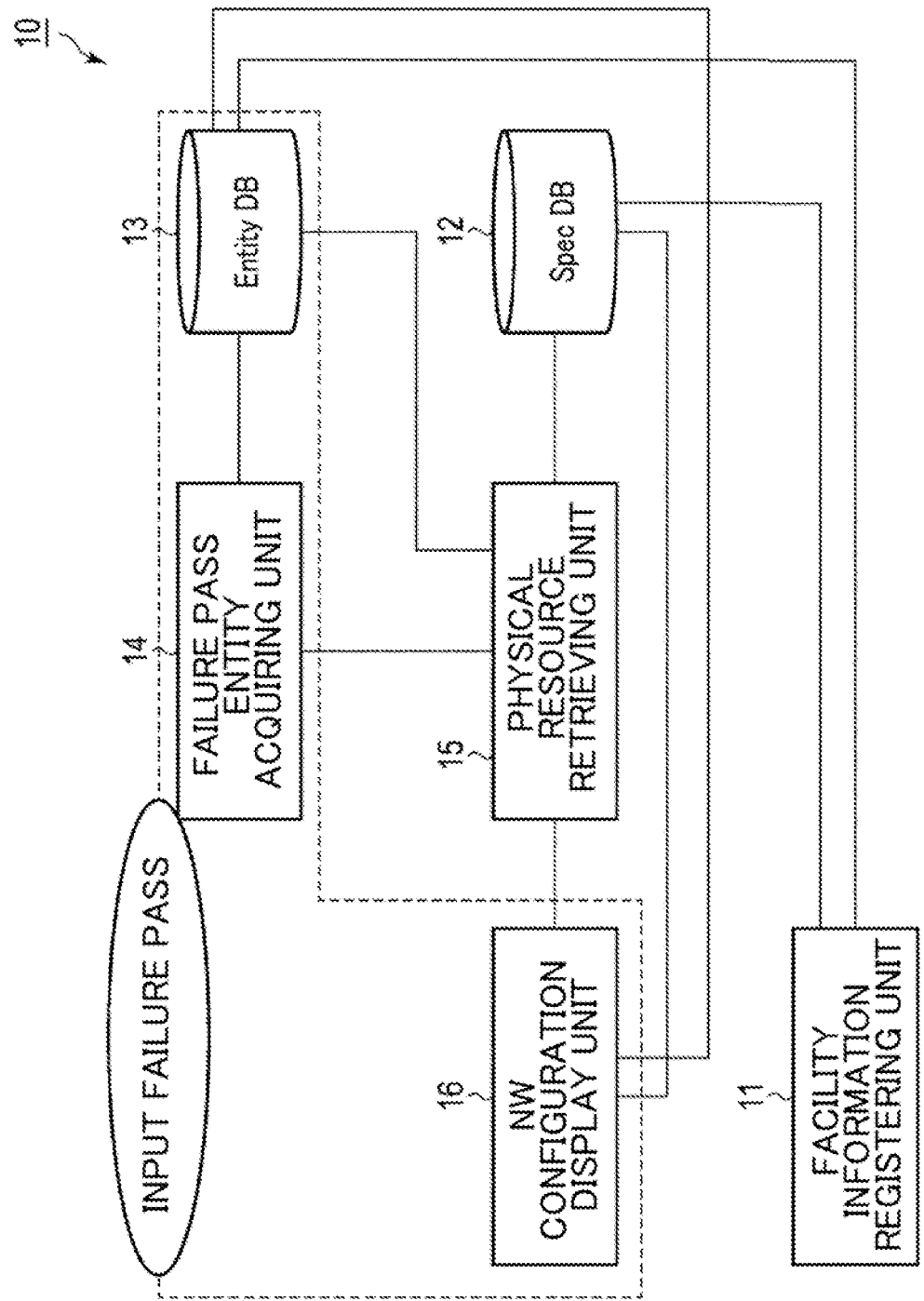
FIG. 24 is a diagram showing an example of a configuration that functions with an input of a failure location in the network management apparatus according to the embodiment of the present invention.

First, a correspondence relationship between an input (use case) of a failure location and functional units will be described. FIG. 24 is a diagram showing an example of a configuration that functions with an input of a failure location in the network management apparatus according to the embodiment of the present invention.

As shown in FIG. 24, in an input of a failure location, the facility information registering unit 11 and the Entity DB 13 function.

Next, processing by the failure pass Entity acquiring unit 14 will be described.

(1) For example, among a drawing object displayed by the NW configuration display unit 16 on a display screen of the network configuration, the failure pass Entity acquiring unit 14 enables an operator to designate, one at a time, a plurality of failure passes via a GUI (Graphical User Interface) in accordance with an operation to an input apparatus such as a keyboard or a mouse.

(2) The failure pass Entity acquiring unit 14 acquires, with respect to one of the drawing objects of the plurality of designated failure passes, an Entity ID unique to each Entity from the Entity DB 13.

(3) The failure pass Entity acquiring unit 14 accesses the Entity DB 13 using the acquired Entity ID as a key and acquires an Entity (hereinafter, sometimes referred to as a failure pass Entity) which corresponds to the failure pass. The acquired result is stored in a failure location Entity array.

Next, retrieval of a physical resource used by a failure pass will be described.

Figure 25:
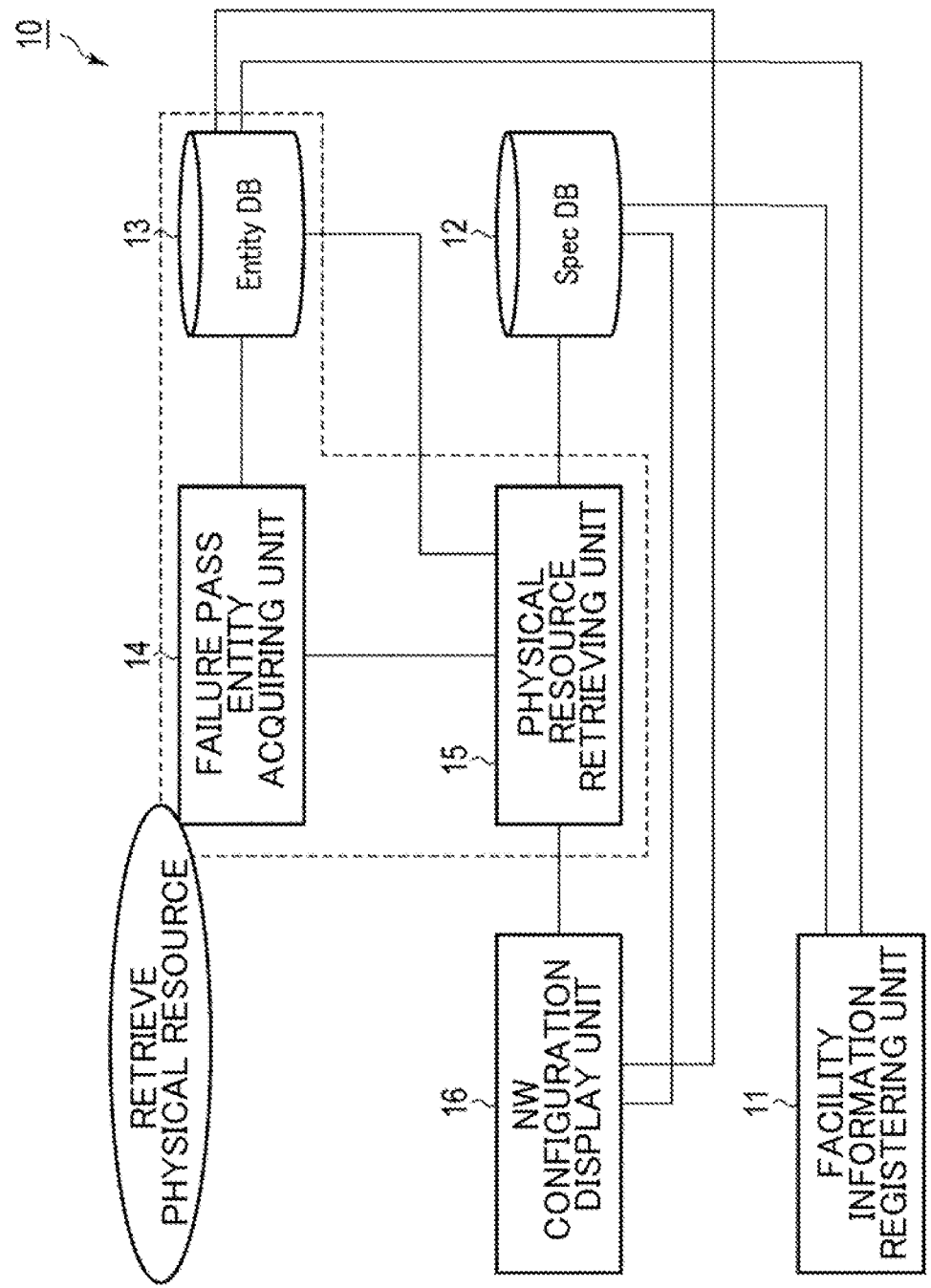
FIG. 25 is a diagram showing an example of a configuration that functions with a retrieval of a physical resource in the network management apparatus according to the embodiment of the present invention.

FIG. 25 is a diagram showing an example of a configuration that functions with a retrieval of a physical resource in the network management apparatus according to the embodiment of the present invention.

As shown in FIG. 25, in the retrieval of a physical resource, the Entity DB 13, the failure pass Entity acquiring unit 14, and the physical resource retrieving unit 15 function.

Next, processing from an input of a failure pass to a retrieval of a physical resource used by a failure pass will be described.

Figure 26:
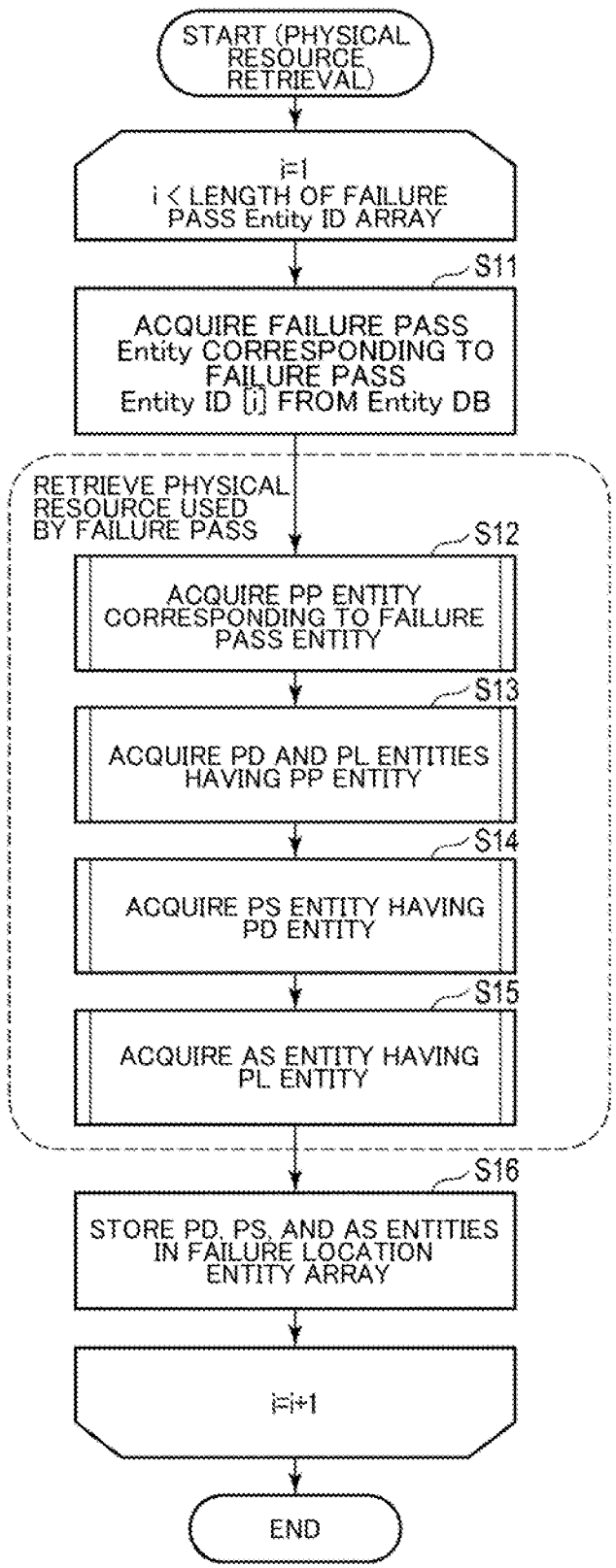
FIG. 26 is a flow chart showing an example of processing procedures from an input of a failure pass to a retrieval of physical and facility resources by the network management apparatus according to the embodiment of the present invention.

FIG. 26 is a flow chart showing an example of processing procedures from an input of a failure pass to a retrieval of physical and facility resources by the network management apparatus according to the embodiment of the present invention.

The physical resource retrieving unit 15 sets an index "i=1" and performs processing of S11 to S16 below until a condition "i<failure pass Entity ID array length" is satisfied.

The physical resource retrieving unit 15 acquires a failure pass Entity corresponding to the failure pass Entity ID [i] from the Entity DB 13 (S11). S11 corresponds to an input of a failure pass.

The physical resource retrieving unit 15 acquires a PP Entity corresponding to the failure pass Entity acquired in S11 from the Entity DB 13 (S12).

The physical resource retrieving unit 15 acquires PD and PL Entities having the PP Entity acquired in S12 from the Entity DB 13 (S13).

The physical resource retrieving unit 15 acquires a PS Entity having the PD Entity acquired in S13 from the Entity DB 13 (S14).

The physical resource retrieving unit 15 acquires an AS Entity having the PL Entity acquired in S13 from the Entity DB 13 (S15). Processing from S12 to S15 corresponds to a retrieval of a physical resource used by a failure pass. Details of the processing from S12 to S15 will be provided later.

The physical resource retrieving unit 15 stores the PD, PS, and AS Entities acquired in S13 to S15 in a failure location Entity array (S16).

After S16, when the index-related condition described above is not satisfied, the physical resource retrieving unit 15 sets an index "i=i+1" and returns to S11. When the condition is satisfied, the processing is terminated.

Next, a type of a failure location Entity array will be described. FIG. 27 is a diagram showing, in a table format, an example of types of an array of failure location Entities to be applied by the network management apparatus according to the embodiment of the present invention.

Types of a failure pass Entity name, a PS EntityList (array), an AS EntityList (array), and a PD EntityList (array) of an array of failure location Entities are as follows.

(1) Failure pass Entity name: Object type
(2) PS EntityList (array): PS Entity type (array)
(3) AS EntityList (array): AS Entity type (array)
(4) PD EntityList (array): PD Entity type (array)

Figure 28:
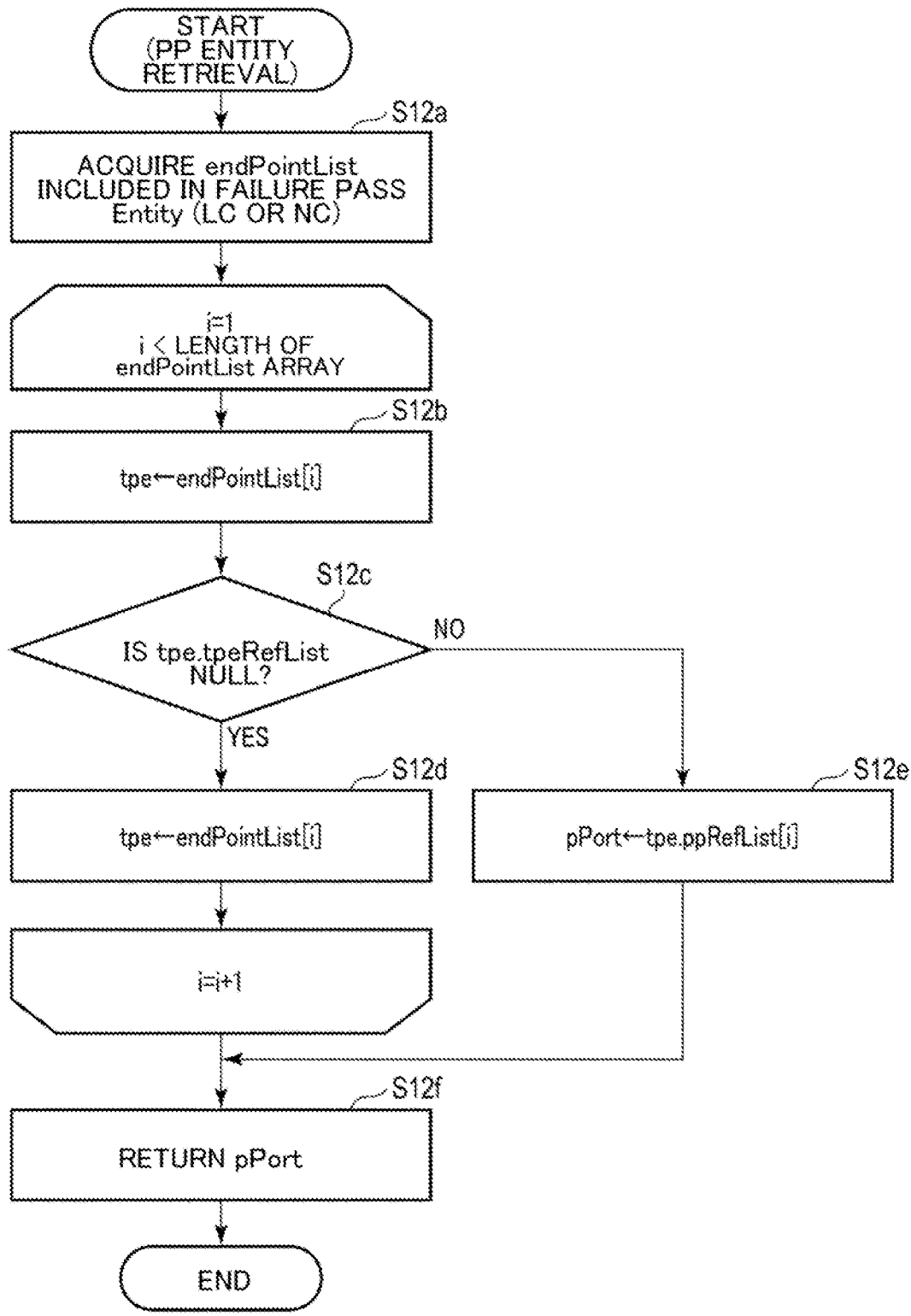
FIG. 28 is a flow chart showing an example of processing procedures of a retrieval of a PP Entity by the network management apparatus according to the embodiment of the present invention.

Next, as details of S12, a retrieval of a PP Entity will be described. FIG. 28 is a flow chart showing an example of processing procedures of a retrieval of a PP Entity by the network management apparatus according to the embodiment of the present invention.

The physical resource retrieving unit 15 acquires an endPointList included in a failure pass Entity (LC or NC) from the Entity DB 13 (S12*a*). Alternatively, in S12*a*, a failure pass Entity (XC) may be designated by an input operation by the operator and the physical resource retrieving unit 15 may acquire an endPointList included in the failure pass Entity (XC) from the Entity DB 13.

The physical resource retrieving unit 15 sets an index "i=1" and performs processing of S12*b* to S12*d* below until a condition "i<endPointList array length" is satisfied.

The physical resource retrieving unit 15 acquires an instance of a TPE Entity from the index i of the endPointList array from the Entity DB 13 and stores the acquired instance in a tpe instance (the instance of the TPE Entity) variable (S12*b*).

The physical resource retrieving unit 15 determines whether or not a tpeRefList attribute included in the instance of the TPE Entity is null (S12*c*).

When a determination of "Yes" is made in S12*c*, the physical resource retrieving unit 15 acquires an instance of a TPE Entity from an endPointList [i] array included in the tpe instance variable from the Entity DB 13 and stores the acquired instance in the tpe instance variable (S12*d*).

After S12*d*, when the condition described above is not satisfied, the physical resource retrieving unit 15 sets an index "i=i+1" and returns to S12*b*.

When a determination of "No" is made in S12*c*, the physical resource retrieving unit 15 acquires an instance (also sometimes referred to as a PP instance) of a PP Entity from a ppRefList [i] array included in the tpe instance variable from the Entity DB 13 and stores the acquired instance in pPort (a pp instance variable) (S12*e*).

When the condition described above is satisfied after S12*d* or, after S12*e*, the physical resource retrieving unit 15 returns pPort to the processing in S13 (S12*f*) and the processing in S12 is terminated.

Figure 29:
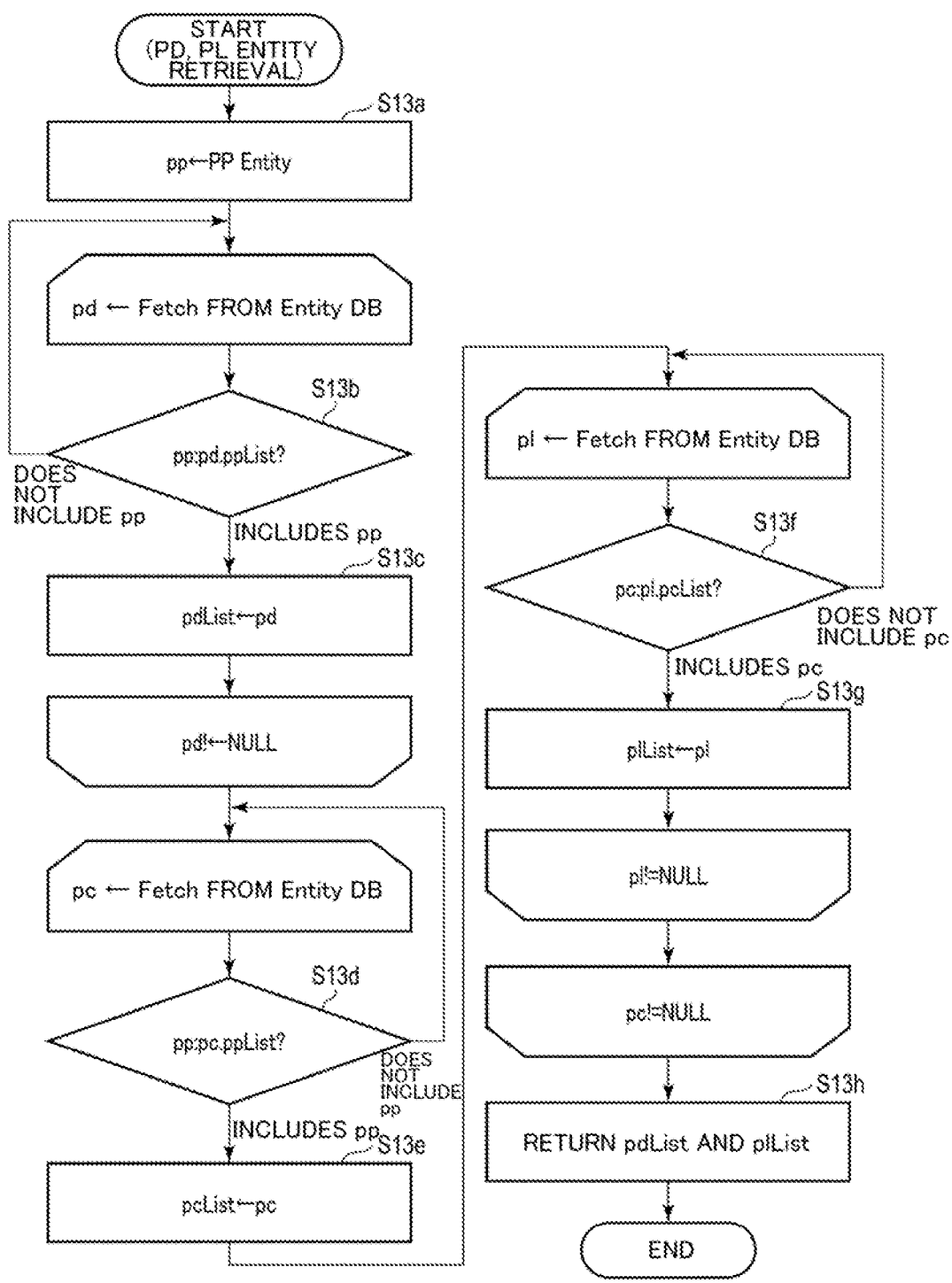
FIG. 29 is a flow chart showing an example of processing procedures of a retrieval of PD and PL Entities by the network management apparatus according to the embodiment of the present invention.

Next, as details of S13, a retrieval of PD and PL Entities having the PP Entity retrieved in S12 will be described. FIG. 29 is a flow chart showing an example of processing procedures of a retrieval of PD and PL Entities by the network management apparatus according to the embodiment of the present invention.

The physical resource retrieving unit 15 stores the PP Entity retrieved in S12 in the pp instance variable (S13*a*).

The physical resource retrieving unit 15 extracts one record of an array (a pd.ppList array (refer to FIG. 2)) of PP Entities included in a PD Entity from the Entity DB 13 and stores the record in a pd instance (an instance of the PD Entity).

In addition, the physical resource retrieving unit 15 determines whether or not the PP instance retrieved in S12 is included in the pd.ppList array (S13*b*).

When a determination of "Yes" is made in S13b, the physical resource retrieving unit 15 stores the PD instance including the PP instance in a pdList array (S13c). When a determination of "No" is made in S13b, a transition is made to S13b related to another record of the pd.ppList array.

After S13c, S13b and S13c are iterated with respect to each record of the pd.ppList array until a condition "pd!=NULL" is satisfied or, in other words, records of the pd.ppList array being a determination target are exhausted. Accordingly, the retrieval of PD Entities having the PP Entity is performed.

When the condition "pd!=NULL" is satisfied after S13c, the physical resource retrieving unit 15 extracts one record of an array (a pc.ppList array (refer to FIG. 2)) of PP Entities included in a PC Entity from the Entity DB 13 and stores the record in a pc instance (an instance of the PC Entity).

In addition, the physical resource retrieving unit 15 determines whether or not the pp instance is included in the pc.ppList array (S13d).

When a determination of "Yes" is made in S13d, the physical resource retrieving unit 15 stores the PC instance including the PP instance in a pcList array (S13e). When a determination of "No" is made in S13d, a transition is made to S13d related to another record of the pc.ppList array.

After S13e, the physical resource retrieving unit 15 extracts one record of an array (a pl.pcList array (refer to FIG. 2)) of PC Entities included in a PL Entity from the Entity DB 13 and stores the record in a pl instance (an instance of the PL Entity).

In addition, the physical resource retrieving unit 15 determines whether or not the pc instance is included in the pl.pcList array (S13f).

When a determination of "Yes" is made in S13f, the physical resource retrieving unit 15 stores the PL instance including the PC instance in a plList array (S13g). When a determination of "No" is made in S13f, a transition is made to S13f related to another record of the pl.pcList array.

After S13g, S13f and S13g are iterated with respect to each record of the pl.pcList array until a condition "pl!=NULL" is satisfied or, in other words, records of the pl.pcList array being a determination target are exhausted. Accordingly, the retrieval of PL Entities having the PC Entity is performed.

By respectively performing a retrieval of a PC Entity including a PP Entity and a retrieval of a PL Entity including the PC Entity, as a result, a retrieval of the PL Entity including the PP Entity is performed.

When the condition "pl!=NULL" described above is satisfied after S13g, S13d and S13e are iterated with respect to each record of the pc.ppList array until a condition "pc!=NULL" is satisfied or, in other words, records of the pc.ppList array being a determination target are exhausted. Accordingly, the retrieval of PC Entities having the PP Entity is performed.

When the condition "pc!=NULL" is satisfied, the physical resource retrieving unit 15 returns the pdList after being stored in S13c to the processing in S14 and the processing in S16, returns the plList after being stored in S13g to the processing in S15 (S13h), and the processing in S13 is terminated.

Next, as details of S14, a retrieval of a PS Entity included in the PD Entity retrieved in S13 will be described.

Figure 30:
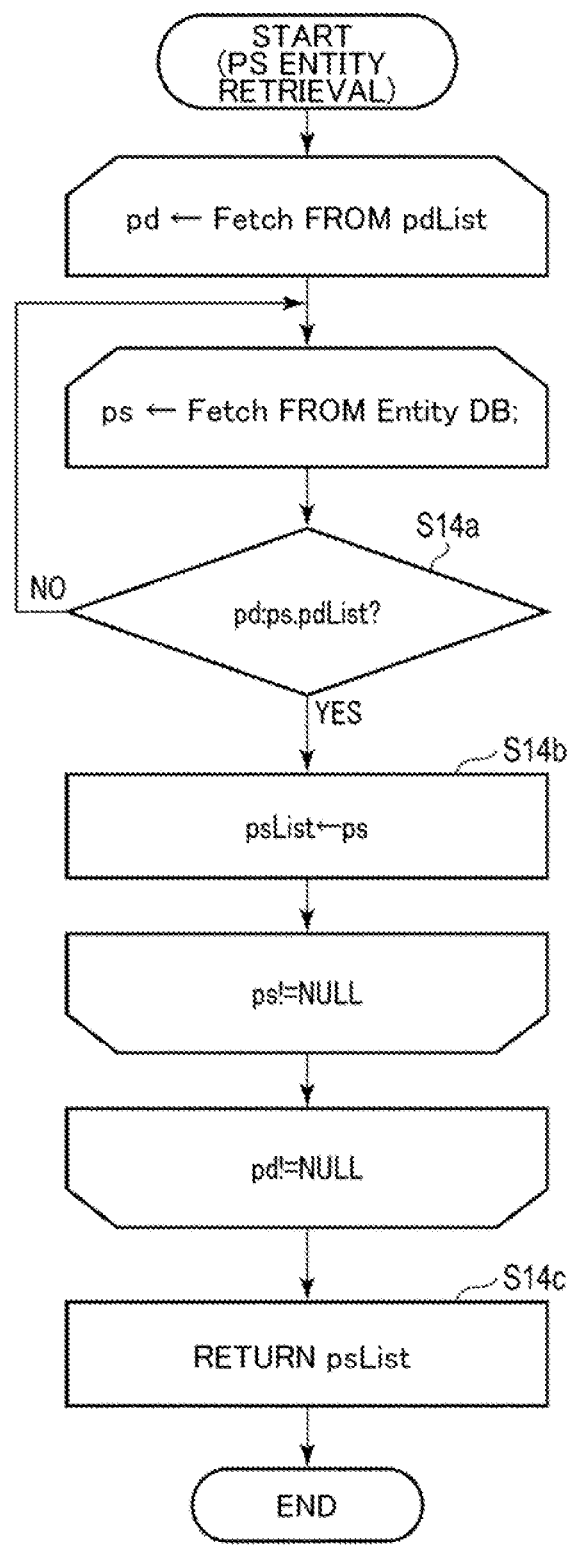
FIG. 30 is a flow chart showing an example of processing procedures of a retrieval of a PS Entity by the network management apparatus according to the embodiment of the present invention.

FIG. 30 is a flow chart showing an example of processing procedures of a retrieval of a PS Entity by the network management apparatus according to the embodiment of the present invention.

The physical resource retrieving unit 15 extracts one record of the pdList retrieved in S13 and stores the record in a pd instance variable.

The physical resource retrieving unit 15 extracts one record of an array (a ps.pdList array (refer to FIG. 1)) of PD Entities included in a PS Entity from the Entity DB 13 and stores the record in a ps instance (an instance of the PS Entity).

In addition, the physical resource retrieving unit 15 determines whether or not the pd instance is included in the ps.pdList array (S14a).

When a determination of "Yes" is made in S14a, the physical resource retrieving unit 15 stores the PS instance including the PD instance in a psList array (S14b). When a determination of "No" is made in S14b, a transition is made to S14a related to another record of the ps.pdList array.

After S14b, S14a and S14b are iterated with respect to each record of the ps.pdList array until a condition "ps!=NULL" is satisfied or, in other words, records of the ps.pdList array being a determination target are exhausted.

When the condition "ps!=NULL" described above is satisfied after S14b, S14a and S14b are iterated with respect to each record of the pdList array until a condition "pd!=NULL" is satisfied or, in other words, records of the pdList array being a target are exhausted. Accordingly, the retrieval of PS Entities having the PD Entity is performed.

When the condition "pd!=NULL" is satisfied, the physical resource retrieving unit 15 returns psList to the processing in S16 (S14c) and the processing in S14 is terminated.

Figure 31:
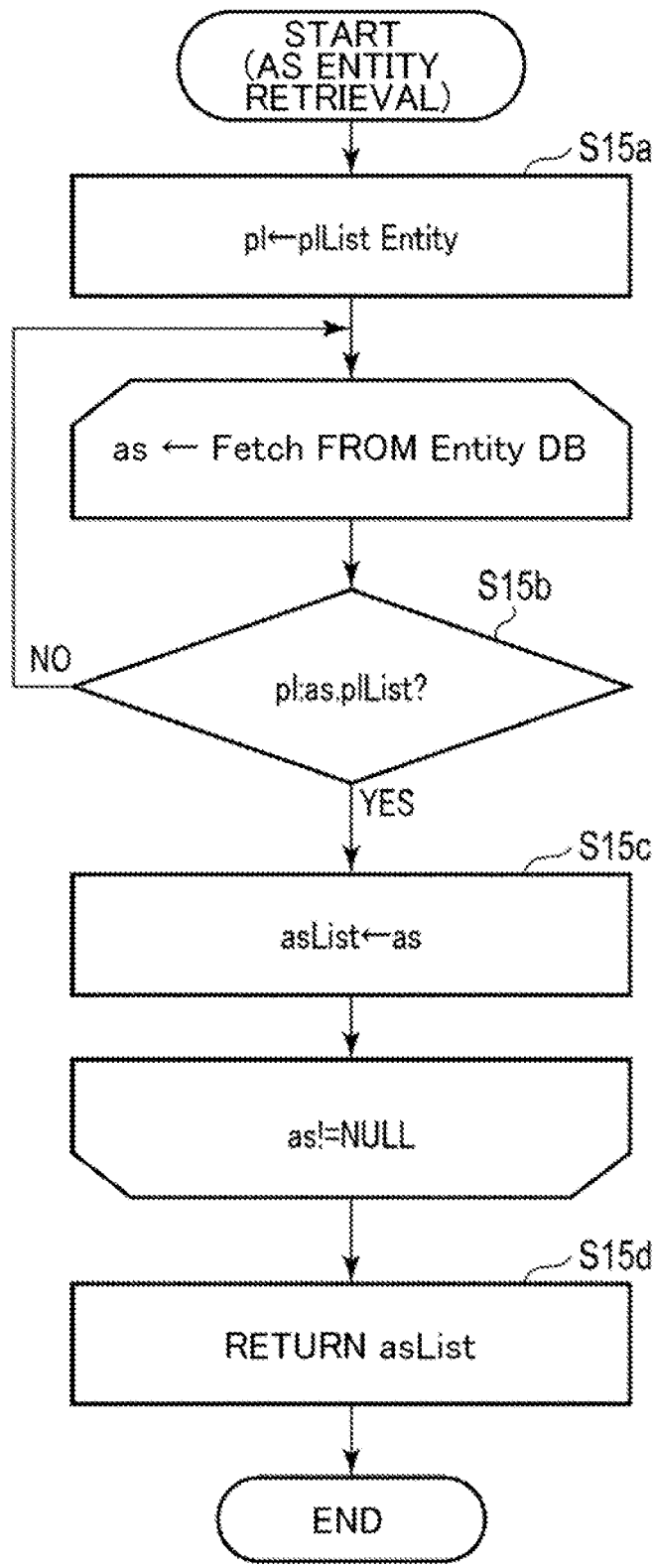
FIG. 31 is a flow chart showing an example of processing procedures of a retrieval of an AS Entity by the network management apparatus according to the embodiment of the present invention.

Next, as details of S15, a retrieval of an AS Entity having the PL Entity retrieved in S13 will be described. FIG. 31 is a flow chart showing an example of processing procedures of a retrieval of an AS Entity by the network management apparatus according to the embodiment of the present invention.

The physical resource retrieving unit 15 stores the plList Entity retrieved in S13 in a pl instance variable (S15a).

The physical resource retrieving unit 15 extracts one record of an array (an as.plList array) of PL Entities included in an AS Entity from the Entity DB 13 and stores the record in an as instance (an instance of the AS Entity).

In addition, the physical resource retrieving unit 15 determines whether or not the pl instance is included in the as.plList array (S15b).

When a determination of "Yes" is made in S15b, the physical resource retrieving unit 15 stores the AS instance including the PL instance in an asList array (S15c). When a determination of "No" is made in S15c, a transition is made to S15b related to another record of the as.plList array.

After S15c, S15b and S15c are iterated with respect to each record of the as.plList array until a condition "as!=NULL" is satisfied or, in other words, records of the as.plList array being a determination target are exhausted.

When the condition "as!=NULL" described above is satisfied after S15c, the physical resource retrieving unit 15 returns asList to the processing in S16 (S15d) and the processing in S15 is terminated. Accordingly, the retrieval of AS Entities having the PL Entity is performed. In addition, as described above, as S16, the physical resource retrieving unit 15 stores the pdList, the psList, and the asList acquired in S13 to S15 in a failure location Entity array.

Figure 32:
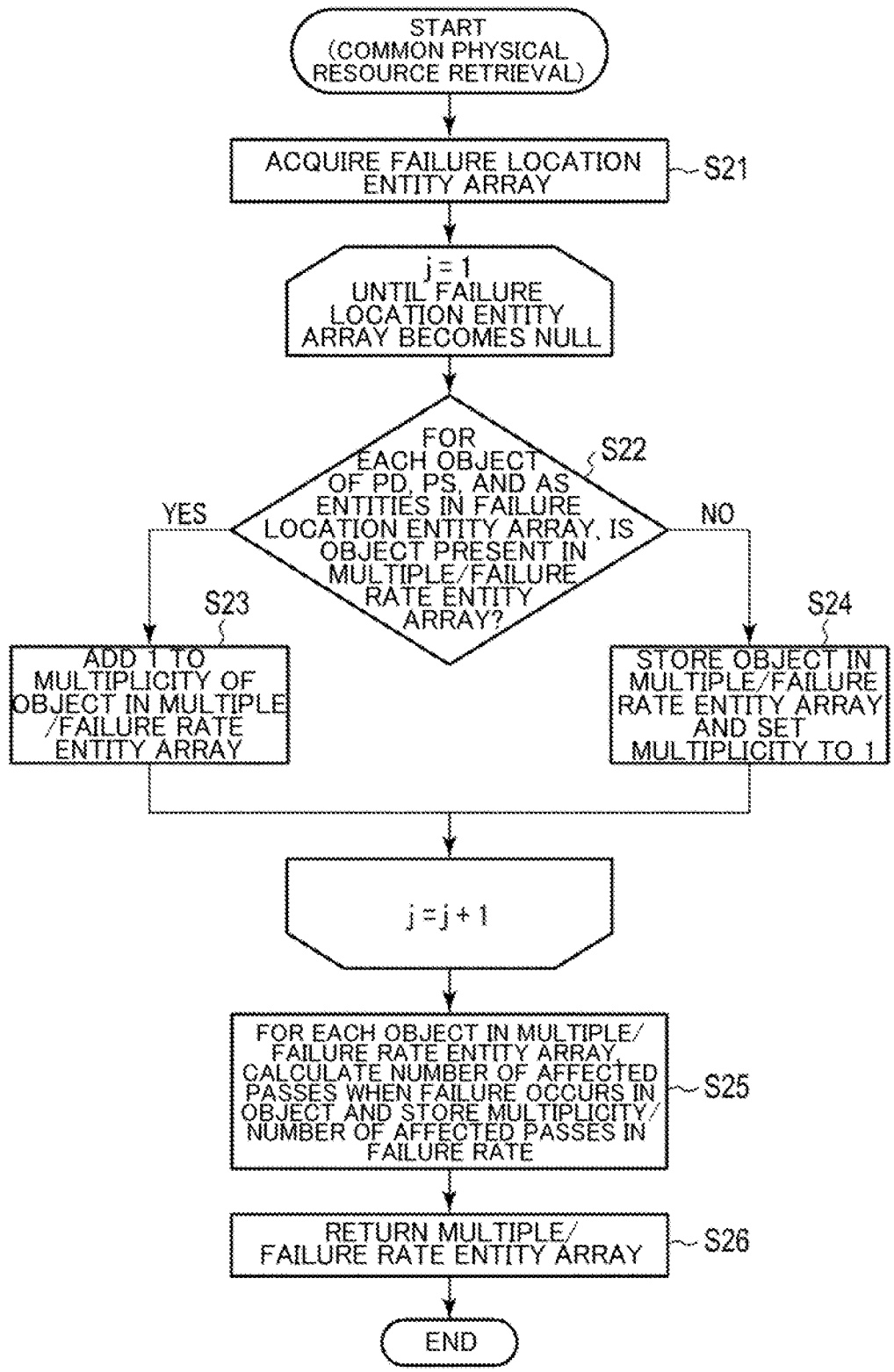
FIG. 32 is a flow chart showing an example of processing procedures of a retrieval of a physical resource to be commonly used by the network management apparatus according to the embodiment of the present invention.

Next, retrieval of a physical resource commonly used by a plurality of failure passes will be described. FIG. 32 is a flow chart showing an example of processing procedures of a retrieval of a physical resource to be commonly used by the network management apparatus according to the embodiment of the present invention.

The physical resource retrieving unit 15 acquires the failure location Entity array stored in S16 from the Entity DB 13 (S21).

The physical resource retrieving unit 15 sets an index "j=1" and S22 to S24 below are iterated until a condition causing an element j of an array of a processing target among the acquired failure location Entity array becomes null.

The physical resource retrieving unit 15 determines, for each object of PD, PS, and AS EntityList arrays corresponding to the element j of the failure location Entity array, whether or not the object is present in a multiple/failure rate Entity array that is a processing target (S22).

When a determination of "Yes" is made in S22, the physical resource retrieving unit 15 updates the multiplicity of the corresponding object in the multiple/failure rate Entity array by adding 1 thereto and stores the updated multiplicity in the multiple/failure rate Entity array that is a processing target (S23).

When a determination of "No" is made in S22, the physical resource retrieving unit 15 sets the multiplicity of the corresponding object in the multiple/failure rate Entity array to 1 and stores the multiplicity in the multiple/failure rate Entity array that is a processing target (S24).

After S23 or S24, when the condition described above related to the index j is not satisfied, the physical resource retrieving unit 15 sets an index "j=j+1" and returns to S22.

After S23 or S24, when the condition described above related to the index j is satisfied, the physical resource retrieving unit 15 calculates, for each object stored in the multiple/failure rate Entity array that is a processing target, the number of passes to be affected when a failure occurs in the object and stores "multiplicity/number of affected passes" in the failure rate of the multiple/failure rate Entity array (S25).

The physical resource retrieving unit 15 returns the corresponding object in the multiple/failure rate Entity array and the multiple/failure rate Entity array in which the multiplicity and the failure rate related to the object are stored and the processing is terminated. Accordingly, a retrieval of a physical resource which is commonly used by a plurality of failure passes and calculation of a failure rate of the physical resource are performed. Alternatively, for example, a calculating unit that differs from the physical resource retrieving unit 15 may be provided in the network management apparatus 10 and processing related to the multiplicity and the failure rate may be performed by the calculating unit.

FIG. 33 is a diagram showing, in a table format, an example of types of an array of a multiple/failure rate Entity to be applied by the network management apparatus according to the embodiment of the present invention.

Types of a multiple Entity and multiplicity of the multiple/failure rate Entity arrays are as follows.

(1) Multiple Entity: Object
(2) Multiplicity: Int
(3) Failure rate: float

FIG. 34 is a diagram showing, in a table format, an example of an array of failure location Entities to be applied by the network management apparatus according to the embodiment of the present invention.

A failure pass Entity name, a PS EntityList, an AS EntityList, and a PD EntityList which are related to an array index "1" in the failure location Entity array shown in FIG. 34 are as follows.

Failure pass Entity name: FRE (LC)_apparatus_2
PS EntityList: PS_A, PS_D
AS EntityList: AS_2
PD EntityList: PD_apparatus_3, PD_apparatus_4

A failure pass Entity name, a PS EntityList, an AS EntityList, and a PD EntityList which are related to an array index "2" in the failure location Entity array shown in FIG. 34 are as follows.

Failure pass Entity name: FRE (LC)_apparatus_3
PS EntityList: PS_A, PS_F
AS EntityList: AS_2
PD EntityList: PD_apparatus_5, PD_apparatus_6

In this example, with respect to the PS EntityList and the AS EntityList, PS_A and AS_2 are respectively multiply present between the array indices "1" and "2" (refer to a and b in FIG. 34), and PS_A and AS_2 correspond to physical resources multiply used by a plurality of failure passes (the FRE (LC)_apparatus_2 and the FRE (LC)_apparatus_3). It should be noted that, in the example described above, the PD EntityList is not multiply present between the array indices "1" and "2" (refer to c in FIG. 34).

The NW configuration display unit 16 highlights and displays a drawing object corresponding to the physical resource retrieved by the physical resource retrieving unit 15 in S12 to S15 by, for example, distinguishing colors on a screen so that the drawing object is distinguished from a drawing object corresponding to other resources in the network configuration.

For example, the NW configuration display unit 16 acquires all Entities of the facility layer and the physical layer in the network configuration from the Entity DB 13 and acquires pieces of Spec information corresponding to all of the Entities from the Spec DB 12 as a Spec array.

The NW configuration display unit 16 acquires two-dimensional coordinates (refer to FIGS. 1 to 3) indicating a position of each Entity from the Entity DB 13 and displays a drawing object of the facility layer and the physical layer at a position corresponding to the acquired coordinates on the screen. Drawing based on coordinate information of an object is also described in WO 2019/167801.

In this case, among the two-dimensional coordinates, the NW configuration display unit 16 acquires two-dimensional coordinates indicating a position of the PD, PS, and AS Entities stored in the failure location Entity array in S16 and highlights and displays a drawing object at this position in, for example, red so that the drawing object is distinguished from other objects.

In addition, among the drawing objects, the NW configuration display unit 16 highlights and displays a drawing object corresponding to a physical resource (a physical layer and a facility layer) used by a plurality of failure passes in, for example, blue so that the drawing object is distinguished from other objects.

Furthermore, colors to be highlighted and displayed may be distinguished from each other in accordance with a magnitude of multiplicity and a magnitude of a failure rate at the same multiplicity. In addition, among information objects to be highlighted and displayed, information objects related to the same multiplicity may be displayed by distinguishing tones or the like so that magnitudes of the failure rate are distinguished.

Figure 35:
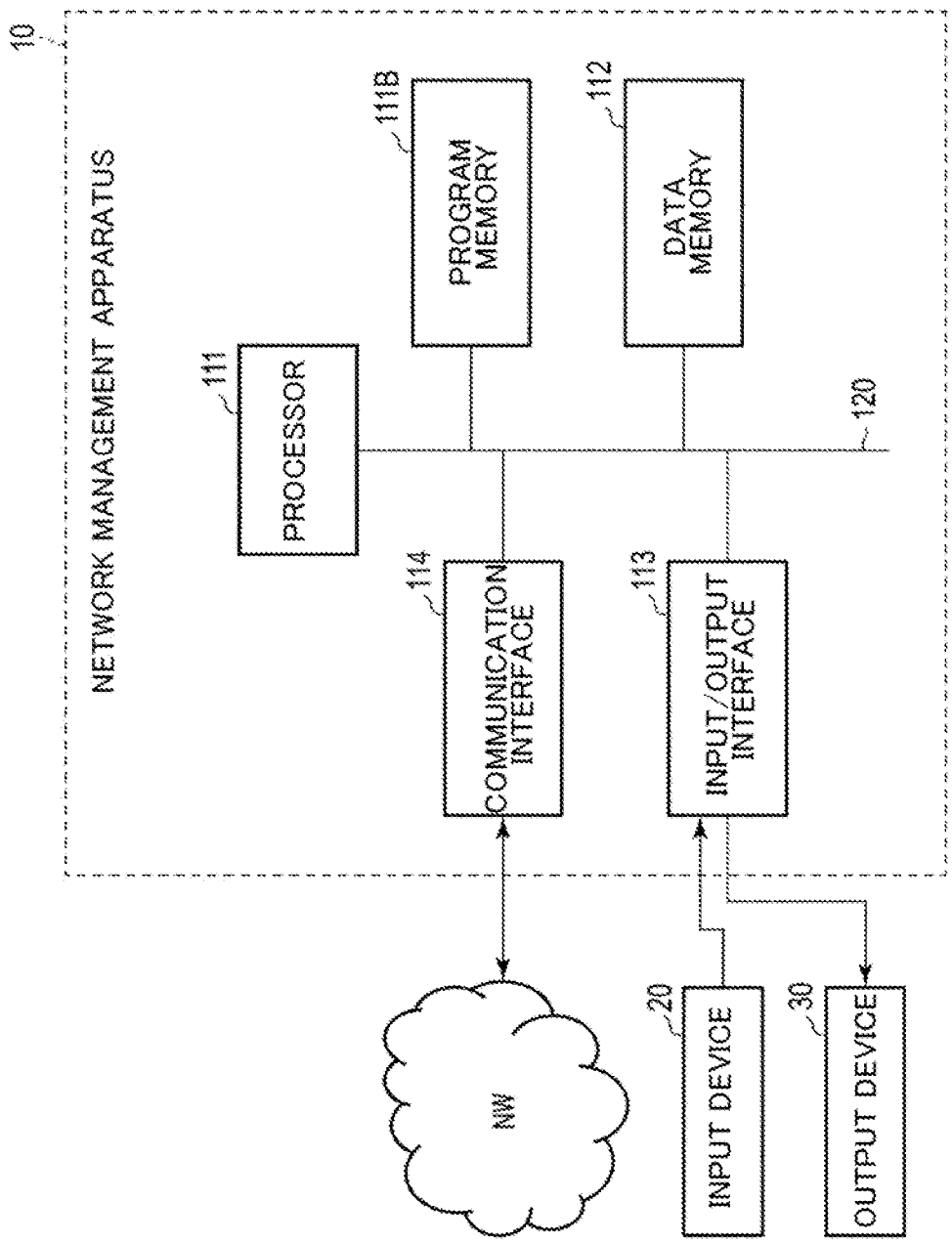
FIG. 35 is a block diagram showing an example of a hardware configuration of the network management apparatus according to the embodiment of the present invention.

FIG. 35 is a block diagram showing an example of a hardware configuration of the network management apparatus according to the embodiment of the present invention.

In the example shown in FIG. 35, the network management apparatus 10 according to the embodiment described above is constituted of, for example, a server computer or a personal computer and includes a hardware processor 111A such as a CPU. In addition, with respect to the hardware processor 111A, a program memory 111B, a data memory 112, an input/output interface 113, and a communication interface 114 are connected via a bus 120.

The communication interface 114 includes, for example, one or more wireless communication interface units and enables transmission and reception of information to and from the communication network NW. As the wireless interface, for example, an interface adopting a low-power wireless data communication standard such as wireless LAN (Local Area Network) is used.

An input device 20 and an output device 30 to be used by an operator which are annexed to the network management apparatus 10 are connected to the input/output interface 113.

The input/output interface 113 performs processing of fetching operation data input by the operator through the input device 20 which is a keyboard, a touch panel, a touchpad, a mouse, or the like and outputting output data to the output device 30 including a display device using liquid crystals or organic EL (Electro Luminescence) and causes the output device 30 to display the output data. It should be noted that devices built into the network management apparatus 10 may be used as the input device 20 and the output device 30 and, in addition, an input device and an output device of another information terminal that is capable of communicating with the network management apparatus 10 via the network NW may be used.

As a non-transitory tangible storage medium, the program memory 111B uses, for example, a combination of a non-volatile memory that enables random write and read such as an HDD (hard disk drive) or an SSD (solid state drive) and a non-volatile memory such as a ROM (read only memory) and stores a program necessary for executing various steps of control processing according to the embodiment.

As a tangible storage medium, the data memory 112 uses, for example, a combination of the non-volatile memory described above and a volatile memory such as a RAM (random access memory) and is used to store various pieces of data acquired and created while performing the various steps of processing.

The network management apparatus 10 according to the embodiment of the present invention can be constituted of, as software-based processing functional units, a data processing apparatus including the facility information registering unit 11, the Spec DB 12, the Entity DB 13, the failure pass Entity acquiring unit 14, the physical resource retrieving unit 15, and the NW configuration display unit 16 shown in FIG. 15.

The Spec DB 12 and the Entity DB 13 can be constructed by using the data memory 112 shown in FIG. 35. However, these regions are not essential components inside the network management apparatus 10 and, for example, the regions may be provided in an external storage medium such as an USB (universal serial bus) memory or in a storage apparatus such as a database server arranged in the cloud.

All of the processing functional units in the respective units of the facility information registering unit 11, the failure pass Entity acquiring unit 14, the physical resource retrieving unit 15, and the NW configuration display unit 16 can be realized by having the hardware processor 111A read a program stored in the program memory 111B and execute the program. It should be noted that a part of or all of the processing functional units may be realized by various other formats including an Application Specific Integrated Circuit (ASIC) or a Field-Programmable Gate Array (FPGA).

As described above, when a failure occurs on a logical layer of a communication network, the network management apparatus according to the embodiment of the present invention is capable of specifying a candidate of a facility to be a failure cause by retrieving an object of a physical layer and a facility layer which corresponds to a failure pass.

In addition, when a failure occurs on a plurality of passes, the network management apparatus can retrieve an object of the physical layer and the logical layer which is multiply used by a plurality of failure passes.

Furthermore, the network management apparatus calculates, for each information object related to the candidate of a facility to be the failure cause, the number of information objects which are associated with the object and which are related to a plurality of occurrence paths of the failure as a multiplicity and calculates, for each information object related to the candidate of a facility to be the failure cause, a failure rate being a proportion of the multiplicity with respect to the number of information objects in the logical layer which are affected when the failure occurs in the object, and information that is promising as a candidate of the failure location can be specified based on the failure rate.

In addition, the method described in each embodiment can be stored, as a program (software means) which can be executed by a computer, in a recording medium such as a magnetic disk (a Floppy disk (registered trademark), a hard disk, or the like), an optical disc (a CD-ROM, a DVD, an MO, or the like), or a semiconductor memory (a ROM, a RAM, a Flash memory, or the like) or transmitted and distributed using a communication medium. The program to be stored on the medium side includes a configuration program that causes software means (including tables and data structures in addition to an executable program) to be executed by a computer to be constructed in the computer. The computer that realizes the present apparatus executes the processing described above by reading the program recorded in the recording medium and, in some cases, constructing the software means using the configuration program, and causing the software means to control operations. A recording medium as used in the present specification is not limited to a recording medium for distribution and includes a storage medium such as a magnetic disk or a semiconductor memory provided in a device inside the computer or connected to the computer via a network.

The present invention should not be limited to the embodiments described above and can be modified in various ways in an implementation stage without departing from the scope of the invention. In addition, the respective embodiments may be implemented in combination, in which case combined effects can be produced. Furthermore, the embodiments described above include various inventions and the various inventions can be extracted according to combinations selected from the plurality of disclosed constituent elements. For example, even when some constituent elements are deleted from all of the constituent elements described in the embodiments, when the problem can be solved and the effects can be produced, a configuration from which the constituent elements have been deleted can be extracted as an invention.

REFERENCE SIGNS LIST

11 Facility information registering unit
12 Spec DB (database)
13 Entity DB
14 Failure pass Entity acquiring unit
15 Physical resource retrieving unit
16 NW configuration display unit

The invention claimed is:

1. A network management apparatus, comprising:
a storage apparatus which stores information indicating a correspondence relationship among an information object related to a logical layer of a network configuration, an information object related to a physical layer, and an information object related to a facility layer that is an object in which the information object related to the physical layer is housed;
a processor; and
a storage medium having computer program instructions stored thereon, when executed by the processor, perform to:
acquire, from the storage apparatus, an information object related to a plurality of occurrence paths of a failure in the logical layer of the network configuration; and
retrieve, as a candidate of a facility to be a failure cause, information objects related to the facility layer and the physical layer commonly associated with the information object related to the plurality of occurrence paths of the failure having been acquired by the acquiring unit among information objects related to the facility layer stored in the storage apparatus;
calculate, for each of the retrieved information objects related to the candidate of a facility to be the failure cause, the number of information objects which are associated with the object and which are related to the plurality of occurrence paths of the failure as a multiplicity; and
calculate, for each of the retrieved information objects related to the candidate of a facility to be the failure cause, a proportion of the multiplicity with respect to the number of information objects in the logical layer which are affected when the failure occurs in the object.

2. The network management apparatus according to claim 1, wherein the computer program instructions further perform to
retrieves a plurality of candidates of a facility to be the failure cause and,
with respect to information objects related to the same multiplicity related to the plurality of retrieved candidates to be the failure cause, specifies the information objects in a descending order of the calculated proportions.

3. The network management apparatus according to claim 1, wherein
information objects related to the facility layer include a first object indicating a facility in which a communication apparatus is housed and a second object indicating a facility in which a communication medium is housed,
information objects related to the physical layer include a port object indicating a communication port to be attached to the communication apparatus, an apparatus object indicating a communication apparatus having the communication port, and a medium object indicating a communication medium capable of connecting to the communication port,
information objects related to the logical layer include a plurality of point objects indicating an occurrence location or a termination of communication and a line object including the point objects,
a correspondence relationship between the information objects related to the logical layer and the information objects related to the physical layer include a correspondence relationship between the point objects and the port object,
a correspondence relationship between the information objects related to the physical layer and the information objects related to the facility layer include a correspondence relationship between the apparatus object and the first object and a correspondence relationship between the medium object and the second object, and the computer program instructions further perform to
retrieves the point object that terminates the line object in the logical layer which corresponds to a plurality of occurrence paths of the failure,
retrieves the port object in the physical layer which corresponds to the retrieved point object,
retrieves the apparatus object and medium object which belong to the port object,
retrieves the first object in the facility layer in which the apparatus object is housed,
retrieves the second object in the facility layer in which the medium object is housed, and
specifies the retrieved first object and second object as candidates of a facility to be the failure cause.

4. The network management apparatus according to claim 1, further comprising
a display processing unit which highlights and displays, relative to other information objects, the information object which has been retrieved by the retrieving unit and which relates to a candidate of a facility to be the failure cause.

5. The network management apparatus according to claim 4, wherein
the display processing unit
highlights and displays, among information objects to be highlighted and displayed, information objects related to the same multiplicity so that magnitudes of the proportion are distinguished.

6. A network management method to be carried out by a network management apparatus including a storage apparatus which stores information indicating a correspondence relationship among an information object related to a logical layer of a network configuration, an information object related to a physical layer, and an information object related to a facility layer that is an object in which the information object related to the physical layer is housed, the network management method comprising the steps of:
acquiring, from the storage apparatus, an information object related to a plurality of occurrence paths of a failure in the logical layer of the network configuration;
retrieving, as a candidate of a facility to be a failure cause, information objects related to the facility layer and the physical layer commonly associated with the information object related to the plurality of occurrence paths of the failure having been acquired among information objects related to the facility layer stored in the storage apparatus;
calculating, for each of the retrieved information objects related to the candidate of a facility to be the failure cause, the number of information objects which are associated with the object and which are related to the plurality of occurrence paths of the failure as a multiplicity; and
calculating, for each of the retrieved information objects related to the candidate of a calculating, for each of the retrieved information objects related to the candidate of a facility to be the failure cause, a proportion of the multiplicity with respect to the number of information objects in the logical layer which are affected when the failure occurs in the object.

7. The network management method according to claim 6, wherein
the retrieving includes:
retrieving a plurality of candidates of a facility to be the failure cause and,
with respect to information objects related to the same multiplicity related to the plurality of retrieved candidates to be the failure cause, specifying the information objects in a descending order of the calculated proportions.

\* \* \* \* \*